United States Patent
Alfano et al.

(10) Patent No.: US 10,640,206 B2
(45) Date of Patent: May 5, 2020

(54) METHOD OF OPTIMIZING SECTIONS OF A TAIL BOOM FOR A ROTARY WING AIRCRAFT

(71) Applicant: AIRBUS HELICOPTERS, Marignane (FR)

(72) Inventors: David Alfano, Velaux (FR); Guillaume Legras, Saint Chamas (FR); Debbie Leusink, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 396 days.

(21) Appl. No.: 15/662,335

(22) Filed: Jul. 28, 2017

(65) Prior Publication Data
US 2018/0029702 A1   Feb. 1, 2018

(30) Foreign Application Priority Data
Jul. 28, 2016   (FR) ..................................... 16 01160

(51) Int. Cl.
*G06F 17/50* (2006.01)
*B64C 27/82* (2006.01)
(Continued)

(52) U.S. Cl.
CPC ............ *B64C 27/82* (2013.01); *B64C 1/0009* (2013.01); *B64C 27/06* (2013.01); *B64F 5/00* (2013.01);
(Continued)

(58) Field of Classification Search
None
See application file for complete search history.

(56) References Cited

U.S. PATENT DOCUMENTS

| | | | |
|---|---|---|---|
| 4,708,305 A | * | 11/1987 | Kelley .................... B64C 23/00 244/17.19 |
| 4,809,930 A | | 3/1989 | Ballerio et al. |

(Continued)

FOREIGN PATENT DOCUMENTS

| | | |
|---|---|---|
| EP | 0099185 | 1/1984 |
| EP | 0524044 | 1/1993 |

(Continued)

OTHER PUBLICATIONS

French Search Report and Written Opinion for French Application No. FR 1601160, Completed by the French Patent Office dated May 30, 2017, All together 17 Pages.

(Continued)

*Primary Examiner* — Rehana Perveen
*Assistant Examiner* — Cuong V Luu
(74) *Attorney, Agent, or Firm* — Brooks Kushman P.C.

(57) ABSTRACT

A method of optimizing sections of a tail boom for a rotary wing aircraft, and also to a tail boom including such sections. The method comprises the step of creating a database characterizing standard sections for a tail boom that give precedence to minimizing a negative lift and/or to increasing a lateral force generated by the air stream from the main rotor of the aircraft flowing over the tail boom, a step of establishing looked-for aerodynamic and structural characteristics for said tail boom, and a step of defining the sections of the tail boom as a function of the standard sections and of the looked-for aerodynamic and structural characteristics. The tail boom as defined in this way optimizes the reduction in the negative lift and/or the increase in the lateral force generated by the air stream from the main rotor.

18 Claims, 2 Drawing Sheets

(51) Int. Cl.
*B64C 1/00* (2006.01)
*G06F 30/20* (2020.01)
*B64C 27/06* (2006.01)
*B64F 5/00* (2017.01)
*G06F 113/28* (2020.01)

(52) U.S. Cl.
CPC .......... *G06F 30/20* (2020.01); *G06F 2113/28* (2020.01); *Y02T 90/50* (2018.05)

(56) References Cited

U.S. PATENT DOCUMENTS

| | | | |
|---|---|---|---|
| 5,209,430 A | 5/1993 | Wilson et al. | |
| 6,352,220 B1 | 3/2002 | Banks et al. | |
| 6,755,374 B1* | 6/2004 | Carson | B64C 27/82 244/17.11 |
| 8,074,920 B2 | 12/2011 | Mikulla | |
| 8,985,503 B2 | 3/2015 | Desroche | |
| 2009/0277991 A1 | 11/2009 | Mikulla | |
| 2012/0280079 A1* | 11/2012 | Brand | B64C 27/82 244/17.19 |
| 2013/0087653 A1* | 4/2013 | Brand | B64C 27/82 244/17.21 |

FOREIGN PATENT DOCUMENTS

| | | |
|---|---|---|
| RU | 2281227 | 8/2006 |
| WO | 2012039702 | 3/2012 |

OTHER PUBLICATIONS

Kelley et al. Document NASA TP3233 AVSCOM Technical Report 92-B-002, Aug. 1992, 32 Pages, "Two-dimensional aerodynamic characteristics of several polygon-shaped cross-sectional models applicable to helicopter fuselages".

Banks et al. NASA/TP-2000-210083, AMCOM-AFDD/TR-00-A-007, Jun. 2000, 52 Pages, "Exploratory investigation of aerodynamic characteristics of helicopter tail boom cross-section models with passive venting".

Wilson et al. NASA Technical Paper 2506, AVSCOM Technical Report 85-B-3, 1986, 76 Pages, "Aerodynamic characteristics of several current helicopter tail boom cross-sections including the effect of spoilers".

Murthy Control and Dynamic Systems V54: System Performance Improvement and Optimization Techniques an Their Applications in Aerospace Systems 1993, XP 055375074, 38 Pages, "Investigation on the use of optimization techniques for helicopter airframe vibrations design studies".

Raptis et al Linear and Nonlinear Control of Small-Scale Unmanned Helicopters 2011, vol. 45, XP 055377109, 16 Pages, "Chapter 4 Simplified rotor dynamics".

Sobester et al. Aircraft Aerodynamic 2015, XP055375378, Uploaded in 3 Parts, All together 266 Pages, "Aircraft aerodynamic design: geometry and optimization".

Sung-Ling Twu et al., Configuration Design Sensitivity Analysis of Built-Up Structures Part II: Numerical Method, International Journal for Numerical Methods in Engineering, Jan. 1, 1993, pp. 4201-4222, XP055567505, 22 pages.

Search Report for European Application No. 17 183 214.0, dated Mar. 19, 2019, 15 pages.

* cited by examiner

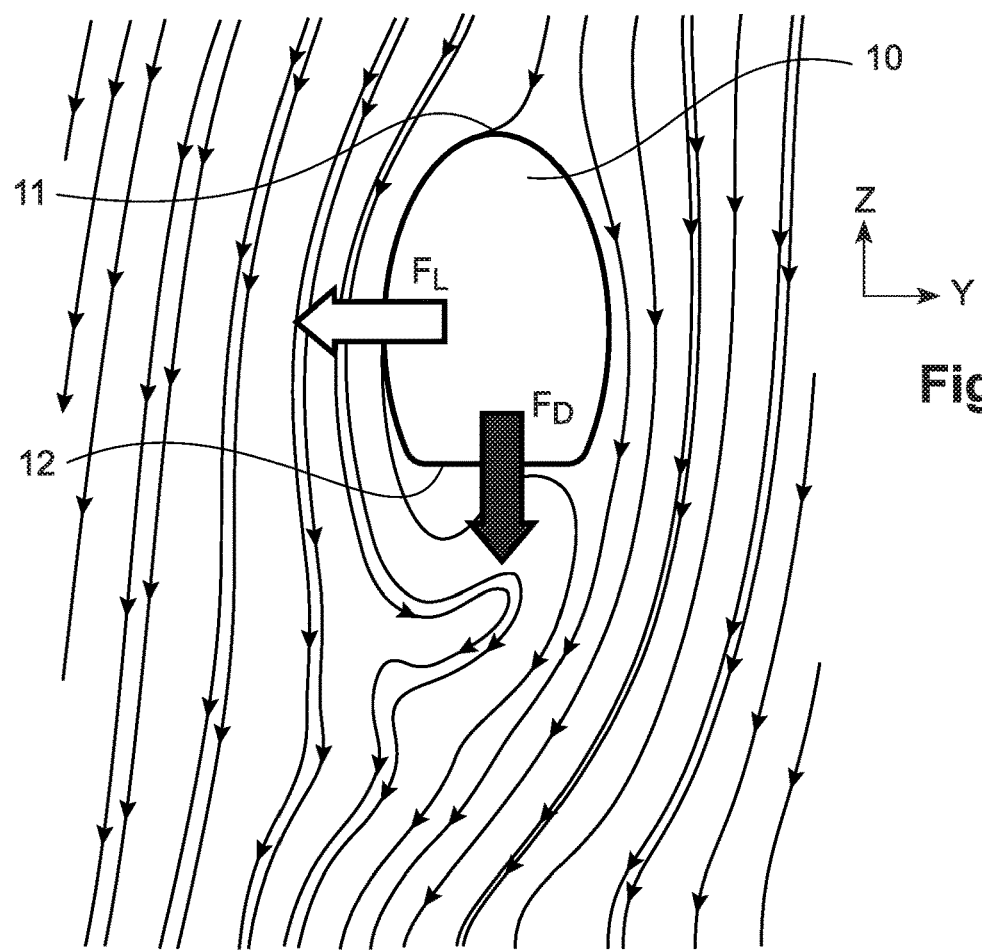
Fig.3
Fig.4
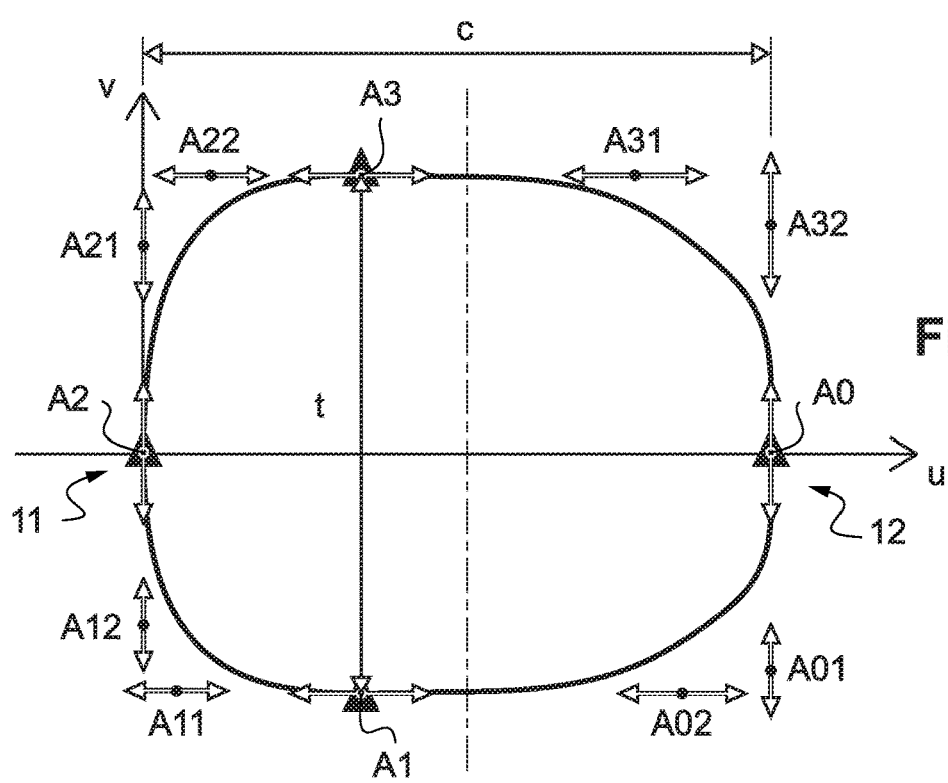
Fig.5

METHOD OF OPTIMIZING SECTIONS OF A TAIL BOOM FOR A ROTARY WING AIRCRAFT

CROSS-REFERENCE TO RELATED APPLICATIONS

This application claims priority to French patent application No. FR 16 01160 filed on Jul. 28, 2016, the disclosure of which is incorporated in its entirety by reference herein.

BACKGROUND OF THE INVENTION

(1) Field of the Invention

The present invention relates to the field of fuselage elements for an aircraft and in particular for a rotary wing aircraft. The present invention relates to a method of optimizing sections of a tail boom for a rotary wing aircraft, and also to a tail boom obtained in this way and to an aircraft provided with such a tail boom.

(2) Description of Related Art

Rotary wing aircraft are flying machines that differ from other powered aircraft mainly in their ability to travel both in cruising flight at high speeds and also to fly at low speeds, and in particular to hover. This ability is made available by making use of at least one rotary wing having a substantially vertical axis of rotation with which the aircraft is provided. Such a rotary wing is situated above a fuselage of the aircraft and is referred to by the term "main rotor". The main rotor has a plurality of blades and is driven in rotation by a power plant of the aircraft. The main rotor provides the aircraft with at least part of its lift and propulsion.

A rotary wing aircraft is generally characterized by three preferred directions: a longitudinal direction X extending from the front of the aircraft towards the rear of the aircraft; a direction in elevation Z extending upwards perpendicularly to the longitudinal direction X; and a transverse direction Y extending from left to right perpendicularly to the longitudinal direction X and the direction in elevation Z.

The longitudinal direction X is the roll axis of the aircraft, the transverse direction Y is its pitching axis, and the direction in elevation Z is its yaw axis. The axis of rotation of the main rotor is substantially close to the yaw axis of the aircraft.

In order to ensure equilibrium for the aircraft about its yaw axis, the aircraft is provided with an anti-torque device creating torque about the yaw axis. This torque serves firstly to oppose and balance the rotor torque, and secondly to make the aircraft maneuverable about the yaw axis, in particular during hovering flight.

Various configurations for anti-torque devices are in existence for rotary wing aircraft.

For example, one anti-torque device is constituted by an auxiliary rotor situated generally at the rear of the aircraft, at the end of a tail boom of the aircraft. The auxiliary rotor is driven in rotation by the power plant of the aircraft. An anti-torque device may also be constituted by a jet of air directed mainly in the transverse direction Y and generally situated at the end or along the tail boom of the aircraft. In these two examples, the anti-torque device creates a transverse force on the tail boom of the aircraft, consequently generating torque about the yaw axis.

In another example, an anti-torque device is constituted by two propellers situated transversely on either side of the fuselage of the aircraft. These two propellers are driven in rotation by the power plant of the aircraft and they create longitudinal forces. These two propellers thus provide the aircraft with part or all of its propulsion, depending on the stage of flight of the aircraft. A difference between the longitudinal forces that are respectively created by each of the propellers serves to generate torque about the yaw axis.

Whatever the anti-torque device used, it is necessary to provide the anti-torque device with mechanical power in order to create the required torque. The mechanical power driving the anti-torque device is in addition to the mechanical power needed for driving the main rotor in rotation. The power plant of the aircraft therefore needs to supply sufficient mechanical power to be able to drive the main rotor and the anti-torque device simultaneously.

In addition, the aircraft has a central airframe constituting the fuselage and carrying the main rotor. The central airframe is extended by a tail boom that extends longitudinally towards the rear of the aircraft, substantially along an anteroposterior plane of symmetry of the aircraft. The tail boom may carry the anti-torque device, e.g. an auxiliary rotor, together with aerodynamic elements such as a vertical fin and a horizontal stabilizer serving to provide the aircraft with stability.

Furthermore, the tail boom extends longitudinally over a maximum length and in the direction in elevation Z over a maximum height. Finally, the tail boom extends laterally over a maximum thickness, while tapering from one flank towards a second flank.

The maximum height of the tail boom is generally greater than its maximum thickness. Nevertheless, particular configurations for the tail boom may require its maximum height to be less than or equal to its maximum thickness, e.g. in order to arrange the tail boom at sufficient height above the ground when the aircraft is on the ground, or indeed for reasons of integrating the tail boom with the fuselage of the aircraft.

Consequently, the tail boom can sometimes be thought of as a thick wing. Specifically, the relative thickness of the tail boom is often large and greater than 0.2, where relative thickness corresponds to the quotient of its maximum thickness divided by its maximum height.

This relative thickness is important in order to ensure that the tail boom has mechanical strength and mode placement suitable for carrying the aerodynamic elements and the auxiliary rotor, if any. Furthermore, such large relative thickness makes it possible to reduce the drag of the tail boom while the aircraft is traveling sideways.

In addition, this relative thickness generally varies along the tail boom in the longitudinal direction of the aircraft. Specifically, the tail boom is typically thicker, i.e. of greater thickness, closer to the fuselage of the aircraft, and it tapers towards the rear of the aircraft, i.e. where it has smaller thickness. For example, relative thickness may vary from 130% closer to the fuselage to 50% at the rear end of the tail boom.

Under such conditions, the air stream passing through the rotating main rotor in flight can impact a top portion of the tail boom. This air stream passing through the main rotor is referred to below more simply as the "air stream".

This top portion then constitutes a leading edge of the tail boom, relative to the air stream. Conversely, the trailing edge is present in a bottom portion of the tail boom. In other words, the leading edge of the tail boom constitutes the highest point of the tail boom in the direction in elevation Z and it faces the main rotor, while the trailing edge of the profile represents in this direction in elevation Z the lowest portion of a section of the profile in a YZ plane.

Under such circumstances, the air stream impacts the tail boom strongly essentially during a stage of hovering flight or during a stage of flight at a low speed of advance, such as during a stage of climbing flight. Likewise, the air stream impacts the tail boom strongly during stages of lateral flight at low speed.

Specifically, during those various stages of flight, the low air speeds due to the movements of the aircraft are not sufficient to move the air stream away from the tail boom. Typically, these low speeds of the aircraft are speeds lower than a limit speed of about 30 knots (kt) to 40 kt, depending in particular on the aircraft and on its weight.

In contrast, as from a faster longitudinal speed of advance, the air stream of the main rotor is deflected towards the rear by the air as a result of the speed of advance of the aircraft, and it then impacts against the tail boom of the aircraft little or not at all.

Nevertheless, during lateral flight at such a speed of advance faster than the limit speed, the tail boom is impacted by another air stream generated by the movement of the aircraft and referred to by the term "infinite stream".

During stages of hovering flight and flight at slow speeds of advance, the air stream impacts the leading edge of the tail boom and splits into two flows of air going round the tail boom. These two flows of air thus pass over both sides of the tail boom, thereby giving rise to aerodynamic forces on the tail boom. These aerodynamic forces comprise aerodynamic lift in the transverse direction Y and aerodynamic drag in the direction in elevation Z. The aerodynamic lift is referred to below as a "lateral force", while the aerodynamic drag is referred to as "negative lift".

The lateral force tends to move the tail boom laterally, thereby generating torque about the yaw axis of the aircraft. The lateral force can then generate torque that is additional to or else that opposes the main torque created by the anti-torque device of the aircraft. The lateral force can thus be beneficial for the aircraft when the torque it generates is additional to the main torque. The lateral force then makes it possible to reduce the mechanical power supplied to the anti-torque device, and consequently to make surplus mechanical power available to the main rotor.

In contrast, the lateral force is penalizing when the torque it generates opposes the main torque from the anti-torque device. The anti-torque device then consumes more mechanical power, which is therefore not available to the main rotor.

The direction and the magnitude of this lateral force depend on the shape of the sections of the tail boom and also on the magnitude and the direction of the air stream from the main rotor. Specifically, the air stream generated by the rotation of the main rotor does not impact against the tail boom in a direction that is purely vertical during hovering flight or indeed during forward flight at low speed, but rather it impacts with a vertical component plus a lateral component due to the rotation of the main rotor.

During lateral flight of the aircraft in the same direction as the lateral component of the air stream, the lateral component may be cancelled in part or in full or even reversed if the lateral speed of the aircraft is sufficient. In contrast, this lateral component of the air stream can be amplified when lateral flight of the aircraft takes place in the direction opposite to the lateral component.

Furthermore, the negative lift tends to move the tail boom and consequently the fuselage of the aircraft downwards, and is thus penalizing, with this negative lift always opposing the lift generated by the main rotor. This negative lift thus tends to reduce the rate of climb of the aircraft and the payload of the aircraft.

In addition, stages of hovering flight and stages of flight with a low speed of advance, be they longitudinal or lateral, are stages that are very demanding in terms of power. It should be observed that it is specifically during these stages of flight that the air stream from the main rotor generates the greatest aerodynamic forces on the tail boom.

It is therefore advantageous to limit the penalizing effects of these aerodynamic forces and to enhance a lateral force that adds to the anti-torque device of the aircraft and/or to minimize negative lift. Maximum power can then be made available for the main rotor during these demanding stages of flight, thereby making it possible to avoid degrading, and possibly even to improve the performance of the aircraft, and in particular its payload.

Furthermore, since the air stream is imposed by the rotation of the main rotor, the shape of the tail boom is a parameter that makes it possible to modify the magnitude and/or the direction of these aerodynamic forces. Nevertheless, modifying the shape of the tail boom of an aircraft in order to limit these penalizing effects can be found to be complex and difficult to achieve.

Specifically, modifying sections of the tail boom in a YZ plane must not be harmful to the quality of flight of the aircraft, and in particular must not significantly degrade the behavior of the aircraft during lateral flight.

A structural modification to a tail boom can also modify its dynamic behavior by giving rise to vibratory problems, and indeed to unwanted resonances.

Likewise, modification to a tail boom must not degrade its ability to carry aerodynamic elements that might be heavy, such as a fin, a stabilizer, and an auxiliary rotor. Modifying a boom by adding orifices enables part of the flow of the air stream from the rotor to take place in a channel situated inside the tail boom, as described in U.S. Pat. No. 6,352,220, and that can be problematic for the structural strength of the tail boom, and also for the associated mode placement.

Adding additional aerodynamic surfaces that might be heavy can also serve to modify the center of gravity of the aircraft, and consequently to modify its aerodynamic behavior in flight. For example, Document EP 0 099 185 describes a tail boom having a deflector situated along a lateral flank of the tail boom, in the top quarter of the tail boom in order to enable the air stream to separate from the tail boom.

Documents RU 2 281 227 and U.S. Pat. No. 5,209,430 describe tail booms fitted with two deflectors, the deflectors being situated along respectively lateral flanks of the tail boom in order to create a lateral force.

U.S. Pat. No. 8,074,920 describes a tail boom having a deflector on its top portion and one or two fins on its bottom portion for directing the air stream laterally.

Those three documents describe a tail boom that tends to oppose the torque induced on the fuselage of the aircraft by a main rotor in order to improve yaw control of the aircraft, but without any significant positive effect on the negative lift of the tail boom.

U.S. Pat. No. 4,809,930 describes a tail boom of bullet-shaped section with a bottom portion that is substantially flat. The top portion of the tail boom is also more tapered towards the rear of the tail boom in order to reduce the negative lift while improving the lateral stability of the aircraft.

Documents WO 2012/039702 and US 2012/280079 present a thin tapering tail boom for generating a lateral force while minimizing negative lift. That tail boom may be provided with a movable flap at its trailing edge in order in particular to modify the lateral force.

Furthermore, U.S. Pat. No. 8,985,503 describes the use of asymmetric profiles for the tail boom together with deflectors arranged on a flank of the tail boom in order to increase the lateral force.

Document EP 0 524 044 describes a tail boom incorporating an anti-torque device having slots formed in the tail boom and fed with fluid under pressure. The outlet for the fluid serves to deflect the air stream from the main rotor, thereby acting in a manner that is substantially analogous to a deflector.

Furthermore, Document NASA TP3233 "Two-dimensional aerodynamic characteristics of several polygon-shaped cross-sectional models applicable to helicopter fuselages", by H. L. Kelley, C. A. Crowelt, and J. C. Wilson, 1992, Document NASA TP2000-210083 "Exploratory investigation of aerodynamic characteristics of helicopter tail boom cross-section models with passive venting", by D. W. Banks and H. L. Kelley, 2000, and Document NASA TP2506 "Aerodynamic characteristics of several current helicopter tail boom cross-sections including the effect of spoilers", by J. C. Wilson and H. L. Kelley, 1986 are also known. Those documents describe wind tunnel studies of various tail boom sections in order to determine the influence of those sections on the negative lift and on the lateral force generated by the incidence of an air stream sweeping over the tail boom.

Document NASA TP3233 describes a comparison of nine different polygonal sections for a tail boom. Document NASA TP2000-210083 describes a comparison of two tail boom sections (a trapezoidal section and an oval section) including openings enabling part of the air stream from the rotor to flow inside the tail boom and/or deflectors. Document NASA TP2506 describes a comparison of three existing tail boom sections with the use of deflectors. The presence of those deflectors serves to increase the lateral force that is generated while simultaneously increasing negative lift.

The Document "Investigation on the use of optimization techniques for helicopter airframe vibrations design studies" by T. Sreekanta Murthy, 1993, describes a method of optimizing the design of an aircraft fuselage that is applicable to optimizing a rotary wing aircraft fuselage including a tail boom for the purpose of reducing the vibration that is generated or transmitted by the fuselage and the tail boom. The sections of the tail boom may in particular be optimized by using the height of each cross-section as a design variable. That method then makes it possible to optimize the sections of a preliminary model of the fuselage and of the tail boom of the aircraft, the preliminary model being previously defined and including a plurality of sections with different heights.

Finally, the technological background of the invention also includes the Documents "Simplified rotor dynamics" by Ioannis A. Raptis 2010, and "Aircraft aerodynamic design: geometry and optimization" by Andras Sobester, 2015.

Under such circumstances, minimizing negative lift and/or increasing the lateral force appearing on the tail boom can be difficult, given those multiple constraints.

BRIEF SUMMARY OF THE INVENTION

An object of the present invention is thus to propose a method of optimizing sections of a tail boom in compliance with looked-for performance criteria. The method makes it possible to define a tail boom possessing appropriate aerodynamic characteristics in order to enable the designer to select between enhancing a reduction in the negative lift or an increase in the lateral force generated on the tail boom, or indeed combining a decrease in the negative lift with an increase in the lateral force during a stage of hovering flight or a stage of flight at a low speed of advance. In addition, the invention also seeks to provide a tail boom including such appropriate aerodynamic characteristics, and an aircraft provided with such a tail boom.

According to the invention, a method of optimizing sections of a tail boom for a rotary wing aircraft having at least one main rotor comprises the following steps:

a step of creating a database characterizing "standard" sections of a tail boom;

a step of establishing looked-for aerodynamic structural characteristics of the tail boom, in particular firstly in terms of lateral force and negative lift generated by the air stream from the main rotor flowing over the tail boom and secondly in terms of dimensions and relative thickness of the tail boom; and a step of defining sections of the tail boom as a function of the "standard" sections and as a function of the looked-for aerodynamic and structural characteristics of the tail boom in order to give precedence to minimizing the negative lift and/or to maximizing the lateral force of the tail boom.

The tail boom extends in a longitudinal direction X of the aircraft along an anteroposterior plane of the aircraft. Each section of the tail boom is defined in a plane perpendicular to the longitudinal direction X by a chord c between a leading edge and a trailing edge of the section, and by a maximum thickness t of said section measured perpendicularly to the chord c.

By way of example, the rotary wing aircraft has a main rotor and an anti-torque device formed by an auxiliary rotor arranged at the end of the tail boom. The anti-torque device may also be formed by two propulsive propellers arranged on either side of a fuselage of the aircraft.

The leading edge of each section of the tail boom is situated facing the main rotor, the trailing edge being situated facing the ground when the aircraft is standing on the ground. The main rotor has a plurality of blades that, on rotating, drive an air stream that sweeps over the tail boom from the leading edge towards the trailing edge. The axis of rotation of the main rotor substantially coincides with the yaw axis of the aircraft.

A main rectangular XYZ reference frame associated with the aircraft is defined above. A secondary (UV) reference frame is associated with each section of the tail boom and is situated in a plane perpendicular to the longitudinal direction X. The abscissa axis U is defined by the direction of the chord c and the ordinate axis V is defined by the direction of the maximum thickness t.

The abscissa axis U and the ordinate axis V may be parallel respectively to the direction in elevation Z and to the transverse direction Y. Nevertheless, the abscissa axis U and the ordinate axis V may also be inclined respectively relative to the direction in elevation Z and to the transverse direction Y, depending on an angle of inclination of each section of the tail boom.

As mentioned above, the air stream from the main rotor causes two aerodynamic forces to appear on the tail boom: the lateral force and the negative lift. In order to improve the performance of the aircraft, it is advantageous to limit the penalizing effects of those aerodynamic forces and thus to minimize the negative lift and/or maximize the lateral force that adds to the effect of the anti-torque device of the aircraft.

It should be observed that the direction of the rotor torque of the main rotor that is opposed by the anti-torque device is associated with the direction of rotation of the main rotor.

Specifically, the rotor torque is due to the reaction of the main rotor of the aircraft to the driving torque used for causing the main rotor to rotate. Specifically, the rotor torque tends to cause the fuselage of the aircraft to rotate about the yaw axis in the direction opposite to the direction of rotation of the main rotor.

For example, for a main rotor turning clockwise when seen from above, the rotor torque is in the counterclockwise direction. Specifically, the anti-torque device needs to generate a clockwise torque and the lateral force therefore needs to be directed so that it too generates a clockwise torque that adds to the effect of the anti-torque device.

Nevertheless, decreasing the negative lift and increasing the lateral force are two mutually opposing characteristics. Specifically, a reduction in the negative lift generally leads to a reduction in the lateral force, and conversely an increase in the lateral force generally leads to an increase in the negative lift.

Maximizing the lateral force is generally preferred in order to limit the power requirements of the anti-torque device and consequently increase the power available for the main rotor. Nevertheless, in certain circumstances, e.g. for an aircraft that is to perform a large number of vertical climbing flights, it can be more advantageous to minimize the negative lift of the tail boom so as to limit directly the power needed by the main rotor.

Thus, the standard sections of a tail boom are defined so as to give preference to minimizing the negative lift and/or to maximizing the lateral force.

In addition, it is appropriate to increase the lateral force in the appropriate direction so that this maximization of the lateral force does indeed add to the effect of the anti-torque device. Specifically, the air stream from the main rotor impacts against the tail boom differently depending on the direction of rotation of the main rotor. Consequently, the lateral force generated on the tail boom is associated with the direction of rotation of the main rotor. It should thus be observed that for a given tail boom, reversing the direction of rotation of the main rotor generally also reverses the direction of the lateral force.

A tail boom of a rotary wing aircraft is traditionally symmetric about an anteroposterior plane of the aircraft. Such a tail boom having sections that are symmetric serves mainly to simplify construction of the tail boom.

Furthermore, a tail boom may be asymmetric and thus present advantageous aerodynamic improvements, particularly increasing the lateral force, while also better adapting its profile to the air stream from the main rotor that impacts against the tail boom at an angle of incidence that is not zero. In contrast, such an asymmetric tail boom also presents structural complexity and this asymmetry can give rise to overall behavior of the aircraft that is not linear.

Advantageously, the method of the invention for optimizing the sections of a tail boom is equally applicable to defining sections that are symmetric and sections that are asymmetric. The behavior of an asymmetric tail boom is then different and not symmetric depending on the side of the tail boom impacted by the air stream from the main rotor, as a function of the direction of rotation of the main rotor, while the behavior of a symmetric tail boom is symmetric when the direction of rotation of the main rotor is reversed.

Specifically, in order to provide given aerodynamic and structural characteristics, the way the sections of a symmetric tail boom are defined is identical regardless of the direction of rotation of the main rotor. In contrast, an asymmetric tail boom needs to be modified by a mirror reflection about a vertical plane containing its leading edge when the direction of rotation of the main rotor is reversed relative to the direction of rotation that led to the definition of the asymmetric tail boom.

The dimensions of a standard section that is asymmetric may have an influence not only on the direction of the lateral force but also on the magnitudes of the lateral force and of the negative lift, and indeed on the speed of lateral flight at which the direction of the lateral force is reversed.

Whether symmetric or asymmetric, each section of the tail boom must also comply with dimensional ranges and mechanical strength structural ranges. The structural ranges are generally defined so that the tail boom is capable of having an anti-torque auxiliary rotor installed at its end together with one or more aerodynamic elements such as a vertical fin or a horizontal stabilizer, and enabling it to withstand contact with the ground during an emergency landing, e.g. in auto-rotation. The dimensional ranges are defined firstly so as to enable technical elements to be installed inside the tail boom, such as a drive shaft for the auxiliary rotor, and elements for modifying the pitch of the blade of the auxiliary rotor, and secondly so as to enable the tail boom to be installed relative to the architecture of the aircraft and its fuselage.

The database thus has standard sections that are symmetric and standard sections that are asymmetric.

As a result, the database has four types of standard section for the tail boom, a first type of standard sections that are symmetric and a second type of standard sections that are asymmetric, both types maximizing the lateral force of the tail boom, together with a third type of standard sections that are symmetric and a fourth type of standard sections that are asymmetric, both types minimizing the negative lift of the tail boom.

These standard sections are determined as a result of studies and/or of digital simulations. The results obtained may also be confirmed and refined by bench testing, e.g. in a wind tunnel and/or in flight.

For example, the standard sections are determined as a result of iterative studies for aerodynamic optimization. These studies are based on the coupling between firstly digital aerodynamic simulations of two-dimensional profiles for evaluating the lateral and negative lift aerodynamic forces on a shape of given profile, and secondly optimization software based on mathematical algorithms for exploring shapes for profiles. As a result of information about the lateral and negative lift forces obtained by the digital simulation tool in association with the various given profile shapes, the optimization tool determines new profile shapes, as constructed in particular using Bezier curves, which seek to optimize the lateral forces and the negative lift. These new shapes can then be evaluated with the digital simulation tool and the iterative process is repeated until these profile shapes are finally optimized.

Each standard section is defined in particular in a secondary (U,V) reference frame by a chord c between the leading edge and the trailing edge, and by a maximum thickness t.

For the first type of standard sections that are symmetric and that maximize the lateral force of the tail boom, the maximum thickness t of a standard section is arranged downstream from the middle of the chord c of the standard section in the flow direction of the air stream from the main rotor. The zone of the tail boom close to the leading edge can then be thin, while the zone close to the trailing edge is thicker, which is favorable to obtaining a larger lateral force, but also to obtaining negative lift that can also be quite large.

For the second type of standard sections that are asymmetric and that maximize the lateral force, the maximum thickness t is arranged in the proximity of the middle of the chord c while being downstream from the middle of the chord c. Since these sections are asymmetric, the two lateral sides of the profile have different curvatures, thus making it possible to generate different pressure distributions on either side of the profile, and consequently generate the looked-for lateral force.

For example, a first side may have considerable curvature in order to accelerate the air stream sweeping over it and thus increase suction. For the second type, the curvature of the profile needs to be broken, or indeed to be substantially flat so as to have a large area on which to apply excess pressure. The pressure difference between the two sides is thus maximized so as to maximize the lateral force.

For the third type of standard section that is symmetric and for the fourth type of standard section that is asymmetric, both of which minimize the negative lift of the tail boom, the maximum thickness t is arranged upstream from the middle of the chord c in the flow direction of the air stream. The zone of the tail boom close to the trailing edge can then be thin while the zone close to the leading edge is thicker, thereby giving rise to the appearance of relatively little negative lift, but also to the appearance of a lateral force that can likewise be quite small.

In other words, with the air stream flowing around each section of the tail boom from the leading edge towards the trailing edge, the maximum thickness t of a standard section is arranged downstream from the middle of the chord c in the flow direction of the air stream, while the maximum thickness t lies between the middle of the chord c and the trailing edge along the abscissa axis U.

Likewise, the maximum thickness t of a standard section is arranged upstream from the middle of the chord c in the flow direction of the air stream when said maximum thickness t lies between the middle of the chord c and the leading edge along the abscissa axis U.

Furthermore, it is considered that the maximum thickness t, also referred to as the "master cross-section" is arranged close to the middle of the chord c when the maximum thickness t is situated at a short distance from the middle of the chord c. This short distance may for example be about 25% of the chord c of the tail boom.

In addition, the ratio t/c of the maximum thickness t of a section of a tail boom divided by the chord c of that section characterizes the relative thickness of that section of the tail boom and generally varies along a tail boom of an aircraft in the longitudinal direction X. This ratio t/c generally decreases from the junction between the tail boom and the fuselage of the aircraft going towards the rear end of the tail boom. This ratio t/c characterizes amongst other things the stiffness and the mechanical strength of a tail boom. This ratio t/c can also be influenced by the architecture of the aircraft, such as a tail boom that is high above the ground, which requires a chord c that is small and consequently a maximum thickness t that is large in order to obtain sufficient structural strength.

Furthermore, this ratio t/c may be very different from one aircraft to another aircraft.

The sections of a tail boom are thus generally different depending on the ratio t/c. Consequently, the standard sections defined during the step of creating the database may also be defined as a function of the ratio t/c.

Each standard section is preferably defined by extreme characteristic points A0, A1, A2, A3 and by intermediate characteristic points A01, A02, A11, A12, A21, A22, A31, A32. These characteristic points are defined in the secondary (U,V) reference frame, which may for example be attached to the leading edge of each standard section, the abscissa axis U being directed from the leading edge towards the trailing edge. One unit along the abscissa axis U or the ordinate axis V is equal to the chord c.

A first extreme characteristic point A0 is situated at the trailing edge and has coordinates (1,0). A second extreme characteristic point A2 is situated at the leading edge and has coordinates (0,0). Furthermore, the extreme characteristic points A1 and A3 define the maximum thickness t of the standard section and have respective ordinate coordinates $-t/(2.c)$ and $t/(2.c)$, with the unit along the ordinate axis V being the chord c. These extreme characteristic points A1 and A3 preferably have the same abscissa coordinates.

The extreme characteristic points A0, A1, A2, A3 are situated on the outline of the standard section, while the intermediate characteristic points A01, A02, A11, A12, A21, A22, A31, A32 are construction points for constructing this outline of the standard section. Thus, going from the trailing edge and the first extreme point A0, the outline of the standard section goes towards the intermediate characteristic point A01 along a direction defined by the characteristic points A0, A01 and reaches the second extreme characteristic point A1 along a direction defined by the characteristic points A02, A1. Thereafter, going from the second extreme characteristic point A1, the outline goes towards the intermediate characteristic point A11 following a direction defined by the characteristic points A1, A11 and reaching the third extreme characteristic point A2 along a direction defined by the characteristic points A12, A2.

Likewise, from the third extreme characteristic point A2, the outline of the standard section goes towards the intermediate characteristic point A21 following a direction defined by the characteristic points A2, A21 and reaches the fourth extreme characteristic point A3 following a direction defined by the characteristic points A22, A3. Finally, from the fourth extreme characteristic point A3, the outline goes towards the intermediate characteristic point A31 following a direction defined by the characteristic points A3, A31 and returns to the first extreme characteristic point A0 following a direction defined by the characteristic points A32, A0.

The database may have tables defining firstly ranges for the abscissa coordinates of the extreme characteristic points A1, A3 defined in the secondary (U,V) reference frame. These tables also define ranges for a characteristic value of each intermediate characteristic point A01, A02, A11, A12, A21, A22, A31, A32.

These characteristic values may be the abscissa coordinates of the intermediate characteristic points A02, A11, A22, A31 and the ordinate coordinates of the intermediate characteristic points A01, A11, A12, A32 in the secondary (U,V) reference frame.

These characteristic values may also define each intermediate characteristic point relative to the distance between the two extreme characteristic points on either side of the intermediate characteristic point. Consequently, the characteristic value needs to be multiplied by the distance between those two extreme characteristic points on either side of the intermediate characteristic point along the abscissa axis in order to obtain the abscissa coordinates of the intermediate characteristic points A02, A11, A22, A31 in the secondary (U,V) reference frame and by the distance between the two extreme characteristic points on either side of each intermediate characteristic point along the ordinate axis in order to obtain the ordinate coordinates of the intermediate characteristic points A11, A12, A21, A32 in the secondary (U,V) reference frame.

For example, for the intermediate characteristic points A01 and A02, the characteristic values in the database need to be multiplied by the distances respectively along the abscissa axis U and the ordinate axis V between the two extreme characteristic points A0 and A1 on either side of the intermediate characteristic points A01 and A02.

These ranges are defined for each type of standard section and relative to the ratio t/c and they are bounded by a low value and by a high value.

The symmetric standard sections of the first and third types are independent of the direction of rotation of the main rotor. In contrast, the asymmetric standard sections of the second and fourth types are different depending on the direction of rotation of the main rotor. Thus, a standard section defined for a main rotor rotating in the counterclockwise direction when seen from above needs to be made symmetric relative to the ordinate axis V in order to define an equivalent standard section for a main rotor rotating in the clockwise direction.

The coordinates of these characteristic points not contained in the database, e.g. the abscissa coordinate of the intermediate characteristic point A01 and the ordinate coordinate of the intermediate characteristic point A02, may be defined by the designer and/or may be imposed by manufacturing constraints.

Nevertheless, the coordinates of these characteristic points that are not contained in the database are preferably imposed by tangency constraints at each extreme characteristic point A0, A1, A2, A3. The missing coordinate for each intermediate characteristic point is thus equal to the same coordinate of each extreme characteristic point that is adjacent to the intermediate characteristic point.

As a result, the ordinate coordinates of the intermediate characteristic points A02, A11 are equal to the ordinate coordinate of the extreme characteristic point A1, and the ordinate coordinates of the intermediate characteristic points A22, A31 are equal to the ordinate coordinate of the extreme characteristic point A3. Likewise, the abscissa coordinates of the intermediate characteristic points A01, A32 are equal to the abscissa coordinate of the extreme characteristic point A0, and the abscissa coordinates of the intermediate characteristic points A12, A21 are equal to the abscissa coordinate of the extreme characteristic point A2.

Advantageously, the outline of the standard section is then tangent continuous.

The outline of each section of the tail boom is preferably closed by connecting together the extreme characteristic points A0, A1, A2, A3 by $4^{th}$-order Bezier curves, the intermediate characteristic points A01, A02, A11, A12, A21, A22, A31, A32 being construction points for constructing each Bezier curve. As a result, the outline of each section of the tail boom is defined by four Bezier curves respectively interconnecting the extreme characteristic points in pairs, firstly the extreme characteristic points A0, A1, then the extreme characteristic points A1, A2, then the extreme characteristic points A2, A3, and finally the extreme characteristic points A3, A0.

Nevertheless, the outline of each section of the tail boom may also be formed by connecting together the extreme characteristic points using other types of curve, such as a Bezier curve of a different order, or indeed a polynomial curve.

Thus, the database may for example comprise the following tables characterizing the standard sections for a main rotor rotating in the counterclockwise direction when seen from above. The abscissa coordinates in the secondary U,V reference frame are identified by the letter "u" and the ordinate coordinates by the letter "v".

The coordinates of these characteristic points that are not contained in the database are imposed by constraints associated with the maximum thickness t of the section for the ordinate coordinates of the extreme characteristic points A1, A3, as mentioned above, and may be imposed by constraints associated with design, manufacture, or indeed tangency for the intermediate characteristic points.

Furthermore, the characteristic values of these intermediate characteristic points are defined relative to the distance between the two extreme characteristic points on either side of each intermediate characteristic point for the following tables.

The database includes the following first table for standard sections of the first type that are symmetric and that maximize the lateral force of the tail boom:

| t/c | value | uA1, uA3 | vA01 | uA02 | uA11 | vA12 | vA21 | uA22 | uA31 | vA32 |
|---|---|---|---|---|---|---|---|---|---|---|
| 50% | low | 0.55 | 0.6 | 0.1 | 0.6 | 0.08 | −0.08 | 0.6 | 0.1 | −0.6 |
|  | high | 0.95 | 0.95 | 0.25 | 0.95 | 0.25 | −0.25 | 0.95 | 0.25 | −0.95 |
| 60% | low | 0.55 | 0.6 | 0.1 | 0.6 | 0.08 | −0.08 | 0.6 | 0.1 | −0.6 |
|  | high | 0.95 | 0.95 | 0.25 | 0.95 | 0.25 | −0.25 | 0.95 | 0.25 | −0.95 |
| 70% | low | 0.55 | 0.6 | 0.08 | 0.6 | 0.08 | −0.08 | 0.6 | 0.08 | −0.6 |
|  | high | 0.95 | 0.95 | 0.4 | 0.95 | 0.25 | −0.25 | 0.95 | 0.4 | −0.95 |
| 80% | low | 0.55 | 0.6 | 0.1 | 0.6 | 0.08 | −0.08 | 0.6 | 0.1 | −0.6 |
|  | high | 0.95 | 0.95 | 0.25 | 0.5 | 0.25 | −0.25 | 0.95 | 0.25 | −0.95 |
| 90%-130% | low | 0.55 | 0.6 | 0.1 | 0.6 | 0.08 | −0.08 | 0.6 | 0.1 | −0.6 |
|  | high | 0.99 | 0.95 | 0.25 | 0.95 | 0.25 | −0.25 | 0.95 | 0.25 | −0.95 |

The database includes the following second table for standard sections of the second type that are asymmetric and that maximize the lateral force of the tail boom:

| t/c | value | uA1, uA3 | vA01 | uA02 | uA11 | vA12 | vA21 | uA22 | uA31 | vA32 |
|---|---|---|---|---|---|---|---|---|---|---|
| 50% | low | 0.45 | 0.08 | 0.6 | 0.08 | 0.6 | −0.6 | 0.08 | 0.25 | −0.1 |
|  | high | 0.75 | 0.25 | 0.95 | 0.25 | 0.95 | −0.95 | 0.25 | 0.45 | −0.3 |

-continued

| t/c | value | uA1, uA3 | vA01 | uA02 | uA11 | vA12 | vA21 | uA22 | uA31 | vA32 |
|---|---|---|---|---|---|---|---|---|---|---|
| 60% | low | 0.45 | 0.08 | 0.6 | 0.08 | 0.6 | −0.6 | 0.08 | 0.6 | −0.1 |
|  | high | 0.75 | 0.25 | 0.95 | 0.25 | 0.95 | −0.95 | 0.25 | 0.95 | −0.3 |
| 70% | low | 0.45 | 0.08 | 0.6 | 0.08 | 0.6 | −0.6 | 0.08 | 0.6 | −0.1 |
|  | high | 0.75 | 0.25 | 0.95 | 0.25 | 0.95 | −0.95 | 0.25 | 0.95 | −0.3 |
| 80% | low | 0.45 | 0.08 | 0.6 | 0.08 | 0.6 | −0.6 | 0.08 | 0.6 | −0.1 |
|  | high | 0.75 | 0.25 | 0.95 | 0.25 | 0.95 | −0.95 | 0.25 | 0.95 | −0.3 |
| 90%-130% | low | 0.5 | 0.1 | 0.6 | 0.08 | 0.6 | −0.6 | 0.08 | 0.6 | −0.1 |
|  | high | 0.99 | 0.6 | 0.95 | 0.25 | 0.95 | −0.95 | 0.25 | 0.95 | −0.3 |

The database includes the following third table for standard sections of the third type that are symmetric and that minimize the negative lift of the tail boom:

| t/c | value | uA1, uA3 | vA01 | uA02 | uA11 | vA12 | vA21 | uA22 | uA31 | vA32 |
|---|---|---|---|---|---|---|---|---|---|---|
| 50% | low | 0.2 | 0.5 | 0.1 | 0.2 | 0.1 | −0.1 | 0.2 | 0.1 | −0.5 |
|  | high | 0.5 | 0.9 | 0.4 | 0.4 | 0.4 | −0.4 | 0.4 | 0.4 | −0.9 |
| 60% | low | 0.2 | 0.5 | 0.1 | 0.3 | 0.1 | −0.1 | 0.3 | 0.1 | −0.5 |
|  | high | 0.5 | 0.9 | 0.4 | 0.7 | 0.4 | −0.4 | 0.7 | 0.4 | −0.9 |
| 70% | low | 0.2 | 0.5 | 0.1 | 0.3 | 0.1 | −0.1 | 0.3 | 0.1 | −0.5 |
|  | high | 0.5 | 0.9 | 0.4 | 0.7 | 0.4 | −0.4 | 0.7 | 0.4 | −0.9 |
| 80% | low | 0.2 | 0.5 | 0.1 | 0.4 | 0.1 | −0.1 | 0.4 | 0.1 | −0.5 |
|  | high | 0.5 | 0.9 | 0.4 | 0.7 | 0.4 | −0.4 | 0.7 | 0.4 | −0.9 |
| 90%-130% | low | 0.2 | 0.5 | 0.1 | 0.7 | 0.1 | −0.1 | 0.7 | 0.1 | −0.5 |
|  | high | 0.5 | 0.9 | 0.4 | 0.95 | 0.4 | −0.4 | 0.95 | 0.4 | −0.9 |

Finally, the database includes the following fourth table for standard sections of the fourth type that are asymmetric and that minimize the negative lift of the tail boom:

| value | uA1, uA3 | vA01 | uA02 | uA11 | vA12 | vA21 | uA22 | uA31 | vA32 |
|---|---|---|---|---|---|---|---|---|---|
| low | 0.2 | 0.1 | 0.55 | 0.1 | 0.65 | −0.65 | 0.1 | 0.65 | −0.1 |
| high | 0.5 | 0.3 | 0.85 | 0.4 | 0.9 | −0.9 | 0.25 | 0.9 | −0.3 |

For this fourth type of standard section, these values are independent of the ratio t/c.

Furthermore, preferred values serving to optimize the lateral force or indeed the negative lift for each standard section may be extracted from these tables for each type of standard section.

Thus, for standard sections of the first type, that are symmetric, the preferred values are:

| t/c | uA1, uA3 | vA01 | uA02 | uA11 | vA12 | vA21 | uA22 | uA31 | vA32 |
|---|---|---|---|---|---|---|---|---|---|
| 50% | 0.75 | 0.8 | 0.15 | 0.8 | 0.15 | −0.15 | 0.8 | 0.15 | −0.8 |
| 60% | 0.77 | 0.8 | 0.15 | 0.8 | 0.15 | −0.15 | 0.8 | 0.15 | −0.8 |
| 70% | 0.85 | 0.8 | 0.15 | 0.8 | 0.15 | −0.15 | 0.8 | 0.15 | −0.8 |
| 80% | 0.85 | 0.8 | 0.15 | 0.8 | 0.15 | −0.15 | 0.8 | 0.15 | −0.8 |
| 90%-130% | 0.85 | 0.8 | 0.15 | 0.8 | 0.15 | −0.15 | 0.8 | 0.15 | −0.8 |

For standard sections of the second type, that are asymmetric, the preferred values are:

| t/c | uA1, uA3 | vA01 | uA02 | uA11 | vA12 | vA21 | uA22 | uA31 | vA32 |
|---|---|---|---|---|---|---|---|---|---|
| 50% | 0.65 | 0.15 | 0.85 | 0.15 | 0.8 | −0.8 | 0.15 | 0.35 | −0.2 |
| 60% | 0.6 | 0.15 | 0.85 | 0.15 | 0.8 | −0.8 | 0.15 | 0.8 | −0.2 |
| 70% | 0.6 | 0.15 | 0.85 | 0.15 | 0.8 | −0.8 | 0.15 | 0.8 | −0.2 |
| 80% | 0.6 | 0.15 | 0.85 | 0.15 | 0.8 | −0.8 | 0.15 | 0.8 | −0.2 |
| 90%-130% | 0.9 | 0.4 | 0.85 | 0.15 | 0.8 | −0.8 | 0.15 | 0.8 | −0.2 |

For standard sections of the third type, that are symmetric, the preferred values are:

| t/c | uA1, uA3 | vA01 | uA02 | uA11 | vA12 | vA21 | uA22 | uA31 | vA32 |
|---|---|---|---|---|---|---|---|---|---|
| 50% | 0.3 | 0.7 | 0.2 | 0.3 | 0.25 | −0.25 | 0.3 | 0.2 | −0.7 |
| 60% | 0.3 | 0.7 | 0.2 | 0.5 | 0.25 | −0.25 | 0.5 | 0.2 | −0.7 |
| 70% | 0.3 | 0.7 | 0.2 | 0.5 | 0.25 | −0.25 | 0.5 | 0.2 | −0.7 |
| 80% | 0.3 | 0.7 | 0.2 | 0.55 | 0.25 | −0.25 | 0.55 | 0.2 | −0.7 |
| 90%-130% | 0.3 | 0.7 | 0.2 | 0.8 | 0.25 | −0.25 | 0.8 | 0.2 | −0.7 |

Finally, for standard sections of the fourth type, that are asymmetric, the preferred values are:

| uA1, uA3 | vA01 | uA02 | uA11 | vA12 | vA21 | uA22 | uA31 | vA32 |
|---|---|---|---|---|---|---|---|---|
| 0.35 | 0.15 | 0.7 | 0.2 | 0.8 | −0.8 | 0.2 | 0.8 | −0.15 |

During this method of optimizing sections of a tail boom, a step of establishing looked-for aerodynamic and structural characteristics of the tail boom is performed.

The looked-for aerodynamic characteristics define in particular the needs of the aircraft in terms of lateral force and/or negative lift generated by the air stream from the main rotor flowing over the tail boom and as a function of the purpose of the aircraft and its main missions. For example, the need for an aircraft that is to perform a large number of vertical climbing flights lies in particular in minimizing the negative lift. Likewise, the need for an aircraft that is to perform a large number of hovering and lateral flights is to maximize the lateral force.

The looked-for structural characteristics define in particular the need for the aircraft in terms of rigidity and mechanical strength, and also in terms of installing the tail boom, and in particular its position relative to the fuselage of the aircraft and relative to the ground. These looked-for structural characteristics thus define dimensional ranges and mechanical strength structural ranges for the tail boom and they make it possible to determine general dimensions for the tail boom and for the relative thicknesses t/c for different longitudinal sections of the tail boom.

Finally, during this method of optimizing sections of a tail boom, a step is performed of defining the sections of the tail boom. Sections are defined as a function of standard sections in the database and of looked-for aerodynamic and structural characteristics of the tail boom in order to optimize these sections.

Furthermore, it should be observed that the standard sections do not include any aerodynamic appendix, such as a deflector or a fin, suitable for modifying the flow of the air stream around the tail boom, and consequently for modifying the aerodynamic forces that appear on the tail boom.

Nevertheless, such appendices may be arranged on the tail boom defined using the method of the invention for optimizing tail boom sections in order to increase the lateral force and/or to reduce the negative lift to a greater extent.

In addition, when an auxiliary rotor is situated at the end of the tail boom, the drive shaft for the auxiliary rotor is arranged inside the tail boom. Specifically, no protective cap is required for the drive shaft at the top of the tail boom, unlike most conventionally used tail booms. This absence of a protective cap for the drive shaft enhances good aerodynamic performance for the tail boom.

The invention also provides a tail boom for a rotary wing aircraft having at least one main rotor, the tail boom extending in a longitudinal direction X along an anteroposterior plane of the aircraft. The tail boom is constituted by successive sections defined in planes perpendicular to the longitudinal direction X by a chord c between a leading edge and a trailing edge and by a maximum thickness t measured perpendicularly to the chord c.

The sections of the tail boom are defined using the above-described method of optimizing sections for a tail boom. These sections of the tail boom are thus defined using a predefined database and as a function of looked-for aerodynamic and structural characteristics of the tail boom. The database characterizes standard sections for the tail boom in four types of standard section and the looked-for aerodynamic and structural characteristics define dimensional ranges and mechanical strength structural ranges and quantify needs in terms of lateral force and/or negative lift generated by the air stream of the main rotor flowing over the tail boom.

In addition to a tail boom, the invention also provides a rotary wing aircraft having a fuselage carrying at least one main rotor provided with a plurality of blades. The fuselage is extended by a tail boom extending in a longitudinal direction X along an anteroposterior plane of the aircraft. The tail boom is then a tail boom as described above.

BRIEF DESCRIPTION OF THE DRAWINGS

The invention and its advantages appear in greater detail from the context of the following description of examples given by way of illustration and with reference to the accompanying figures, in which:

FIG. 3 is a view showing the flow of the air stream around the tail boom;

FIG. 4 is a summary diagram showing a method of optimizing tail boom sections; and FIG. 5 shows an example of a tail boom section.

Elements present in more than one of the figures are given the same references in each of them.

DETAILED DESCRIPTION OF THE INVENTION

Figure 1:
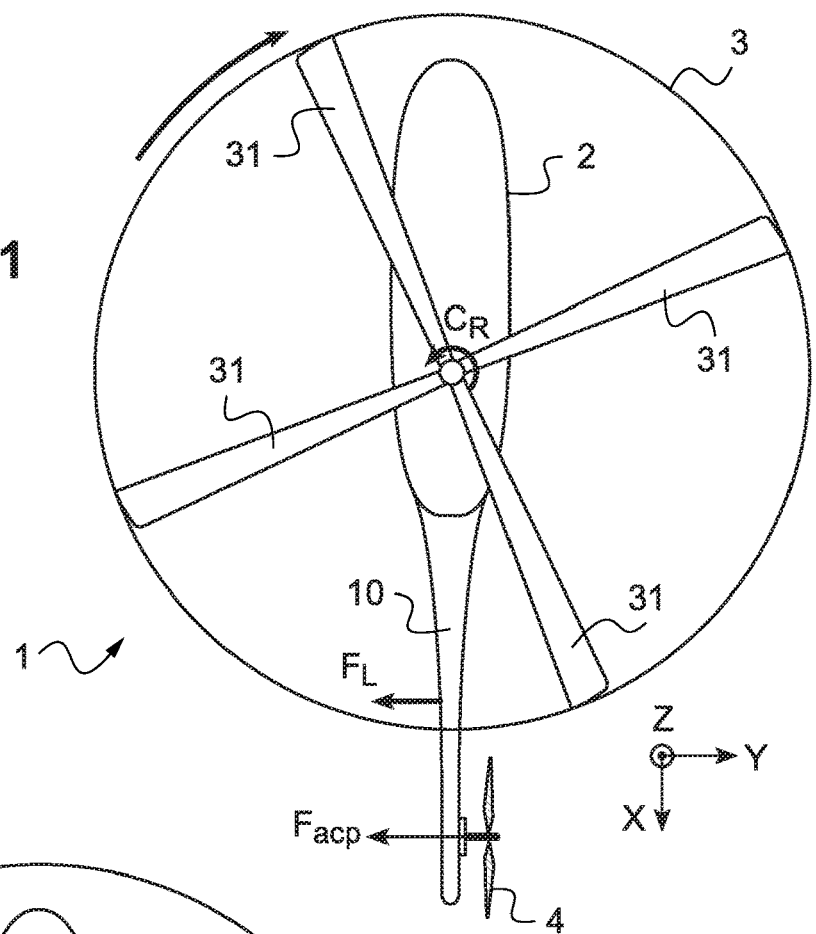
FIGS. 1 and 2 are two plan views of a rotary wing aircraft.
Figure 2:
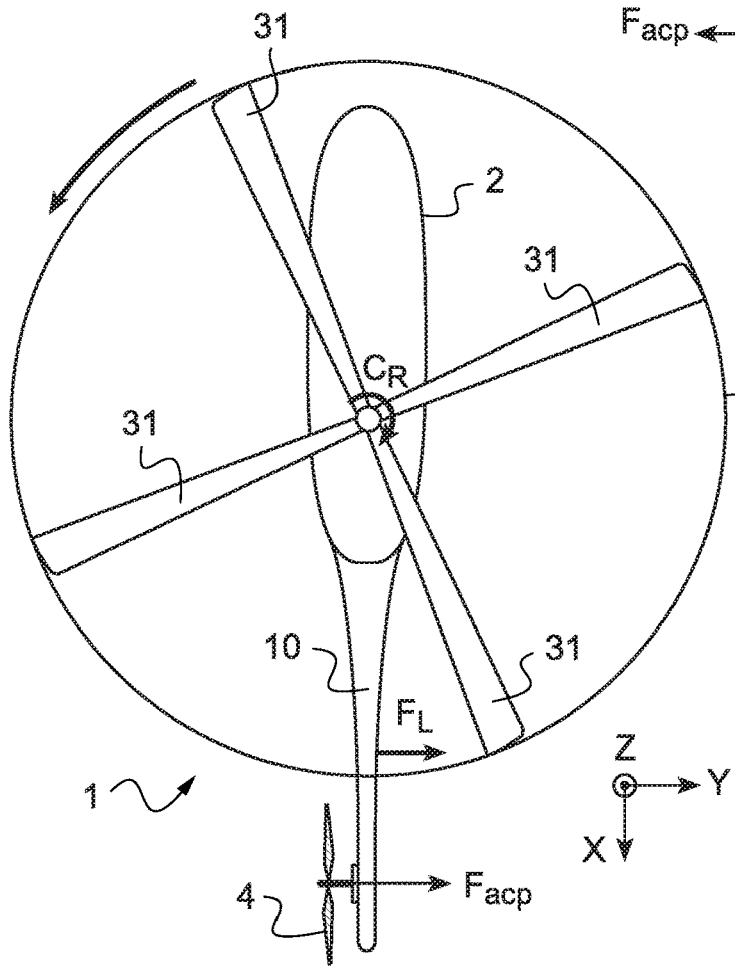

In FIGS. 1 and 2, a rotary wing aircraft 1 is shown as seen from above. The aircraft 1 comprises a fuselage 2, a tail boom 10, a main rotor 3, and an anti-torque auxiliary rotor 4.

A main rectangular (X,Y,Z) reference frame is associated with the aircraft 1. The longitudinal direction X extends from the front of the aircraft 1 towards the rear of the aircraft 1, and the transverse direction Y extends from left to right perpendicularly to the longitudinal direction X. The direction in elevation Z then extends upwards and is perpendicular to the longitudinal and transverse directions X and Y.

The longitudinal direction X is the roll axis of the aircraft 1, the transverse direction Y is the pitching axis, and the elevation direction Z is the yaw axis.

The main rotor 3 is positioned above the fuselage 2 and has an axis of rotation that is substantially vertical, i.e. substantially parallel to the direction in elevation Z. The main rotor 3 is provided with four main blades 31 driven in rotation by a power plant of the aircraft 1, and it serves to provide the aircraft 1 with propulsion and also with lift.

The tail boom 10 is connected to the fuselage 2 and extends in the longitudinal direction X from the fuselage 2 and towards the rear of the aircraft 1.

The auxiliary rotor 4 is positioned at the free end of the tail boom 10 and its axis of rotation is substantially horizontal, parallel to the transverse direction Y. The auxiliary rotor 4 is also driven in rotation by the power plant of the aircraft 1.

In FIG. 1, the main rotor 3 rotates clockwise and a rotor torque $C_R$ acting counterclockwise is then applied to the fuselage 2 about the axis of rotation of the main rotor 3. In order to balance the rotor torque $C_R$, the auxiliary rotor 4 generates a transverse force $F_{acp}$ directed to the left of the fuselage 2, thereby creating a main torque opposing the rotor torque $C_R$.

Furthermore, the tail boom 10 is swept by the air stream generated by the main rotor 3 rotating clockwise, and consequently generates a lateral aerodynamic force $F_L$ directed to the left of the fuselage 2, thereby creating a torque that adds to the main torque.

In FIG. 2, the main rotor 3 rotates counterclockwise and a rotor torque $C_R$ oriented in the clockwise direction is then applied to the fuselage 2 about the axis of rotation of the main rotor 3. In order to balance this rotor torque $C_R$, the auxiliary rotor 4 generates a transverse force $F_{acp}$ directed to the right of the fuselage 2, thereby creating a main torque opposing the rotor torque $C_R$.

In addition, the tail boom 10 is swept by the air stream generated by the main rotor 3 rotating in the counterclockwise direction, and consequently it generates a lateral aerodynamic force $F_L$ directed to the right of the fuselage 2, thereby creating a torque that is additional to the main torque.

FIG. 3 is a view showing the flow of the air stream around the tail boom 10. In FIG. 3, a section of the tail boom 10 is seen from the rear of the aircraft 1 in a plane perpendicular to the longitudinal direction X of the aircraft 1. This air stream is generated by a main rotor 3 rotating in the clockwise direction, as shown in FIG. 1, during hovering flight or flight at a slow speed of advance of the aircraft 1. This air stream sweeps the tail boom 10 from a leading edge 11 situated facing the main rotor 3 towards a trailing edge 12.

It can be seen that the air stream does not sweep the tail boom 10 in a direction that is purely vertical, but rather in a direction that is inclined from right to left as a result of the effect of the clockwise rotation of the main rotor 3. Consequently, the air streams sweeping the right side and the left side of the tail boom 10 are not identical.

The difference between these air streams, and the shape of the section of the tail boom 10 contribute to the lateral aerodynamic force $F_L$ appearing, which force is a horizontal force in the transverse direction Y. Furthermore, a downwardly-directed vertical aerodynamic force, referred to as negative lift $F_D$, also appears at the trailing edge of the tail boom 10.

Advantageously, and as shown in FIGS. 1 and 2, the lateral force $F_L$ creates torque that adds to the main torque generated by the auxiliary rotor 4 and contributes to balancing the rotor torque $C_R$. Consequently, the need of the auxiliary rotor 4 for mechanical power is reduced, thereby enabling the power plant of the aircraft 1 to deliver additional mechanical power for driving rotation of the main rotor 3.

Nevertheless, depending on the shapes of the sections of the tail boom 10 and on the orientation of the air stream, the lateral force $F_L$ might create a torque opposing the main torque generated by the auxiliary rotor 4. Consequently, the auxiliary rotor 4 has an increased need for mechanical power, thereby penalizing the performance of the aircraft 1.

In contrast, the negative lift $F_D$, which is always directed downwards, always opposes the lift generated by the main rotor 3. This negative lift $F_D$ is thus always penalizing for the performance of the aircraft 1.

FIG. 5 shows an example of a section of a tail boom 10 corresponding to a standard type of section that is symmetric and optimized for minimizing negative lift $F_D$. This section is defined by a method of optimizing sections of a tail boom, which method is summarized as shown in FIG. 4.

In FIG. 5, a secondary (U,V) reference frame is associated with the leading edge 11 of the section of the tail boom and is situated in a plane perpendicular to the longitudinal direction X. The abscissa axis U is defined by the direction of the chord c of the section of the tail boom 10 and extends from the leading edge 11 to the trailing edge 12 parallel to the direction in elevation Z. The ordinate axis V is defined by the direction of the maximum thickness t of the section of the tail boom 10 and is parallel to the transverse direction Y. One unit along the abscissa axis U and along the ordinate axis V is equal to the chord c.

The method of optimizing sections of a tail boom comprises a step 101 of creating a database characterizing "standard" sections of a tail boom. The database has been established as a result of studies and numerical simulations, and has subsequently been confirmed by testing.

This database comprises four types of standard sections for the tail boom 10, a first type of standard sections that are symmetric and a second type of standard sections that are asymmetric, both types maximizing the lateral force $F_L$, together with a third type of standard sections that are symmetric and a fourth type of standard sections that are asymmetric, both minimizing the negative lift $F_D$.

Each standard section is defined by extreme characteristic points A0, A1, A2, A3 and by intermediate characteristic points A01, A02, A11, A12, A21, A22, A31, A32 defined in the secondary (U,V) reference frame. The extreme characteristic points A0, A1, A2, A3 are situated on the outline of the standard section, whereas the intermediate characteristic points A01, A02, A11, A12, A21, A22, A31, A32 are points for constructing the outline. The outline of each section of the tail boom 10 is defined by four $4^{th}$-order Bezier curves respectively connecting together pairs of extreme characteristic points A0, A1, A2, A3, as shown in FIG. 5.

Thus, the intermediate characteristic points A01, A02, A11, A12, A21, A22, A31, A32 are construction points for each Bezier curve, defining firstly the shape of the outline and secondly the tangency of the outline at each extreme characteristic point A0, A1, A2, A3. For example, the shape of the section is more or less elongated at each extreme characteristic point A0, A1, A2, A3 depending on whether each intermediate characteristic point is further away from or closer to the extreme characteristic point A0, A1, A2, A3 to which it is attached. The outline of each section of the tail boom 10 may also be formed by connecting together the extreme characteristic points by other types of polynomial curve.

The database comprises the following tables defining ranges firstly for the abscissa coordinates of the extreme characteristic points A1, A3 and secondly for the characteristic values of the abscissa coordinates of the intermediate characteristic points A02, A11, A22, A31 having the same ordinate coordinates as the intermediate characteristic points A01, A11, A12, A32 for each type of standard section.

The abscissa coordinates of the extreme characteristic points A1, A3 are defined directly in the secondary (U,V) reference frame. The characteristic values of the intermediate characteristic points are defined relative to the distance between the two extreme characteristic points respectively on either sides of each intermediate characteristic point.

These ranges, and consequently these standard sections, are a function of the ratio t/c of the maximum thickness t of a section of a tail boom 10 divided by the chord c of the section. This ratio t/c characterizes the relative thickness of this section of the tail boom and generally varies along a tail boom 10 in the longitudinal direction X of the aircraft 1.

The first table below relates to standard sections of the first type that are symmetric and that maximize the lateral force $F_L$ of the tail boom:

| t/c | value | uA1, uA3 | vA01 | uA02 | uA11 | vA12 | vA21 | uA22 | uA31 | vA32 |
|---|---|---|---|---|---|---|---|---|---|---|
| 50% | low | 0.55 | 0.6 | 0.1 | 0.6 | 0.08 | −0.08 | 0.6 | 0.1 | −0.6 |
|  | high | 0.95 | 0.95 | 0.25 | 0.95 | 0.25 | −0.25 | 0.95 | 0.25 | −0.95 |
| 60% | low | 0.55 | 0.6 | 0.1 | 0.6 | 0.08 | −0.08 | 0.6 | 0.1 | −0.6 |
|  | high | 0.95 | 0.95 | 0.25 | 0.95 | 0.25 | −0.25 | 0.95 | 0.25 | −0.95 |
| 70% | low | 0.55 | 0.6 | 0.08 | 0.6 | 0.08 | −0.08 | 0.6 | 0.08 | −0.6 |
|  | high | 0.95 | 0.95 | 0.4 | 0.95 | 0.25 | −0.25 | 0.95 | 0.4 | −0.95 |
| 80% | low | 0.55 | 0.6 | 0.1 | 0.6 | 0.08 | −0.08 | 0.6 | 0.1 | −0.6 |
|  | high | 0.95 | 0.95 | 0.25 | 0.95 | 0.25 | −0.25 | 0.95 | 0.25 | −0.95 |
| 90%-130% | low | 0.55 | 0.6 | 0.1 | 0.6 | 0.08 | −0.08 | 0.6 | 0.1 | −0.6 |
|  | high | 0.99 | 0.95 | 0.25 | 0.95 | 0.25 | −0.25 | 0.95 | 0.25 | −0.95 |

The second table below relates to standard sections of the second type that are asymmetric and that maximize the lateral force $F_L$ of the tail boom:

| t/c | value | uA1, uA3 | vA01 | uA02 | uA11 | vA12 | vA21 | uA22 | uA31 | vA32 |
|---|---|---|---|---|---|---|---|---|---|---|
| 50% | low | 0.45 | 0.08 | 0.6 | 0.08 | 0.6 | −0.6 | 0.08 | 0.25 | −0.1 |
|  | high | 0.75 | 0.25 | 0.95 | 0.25 | 0.95 | −0.95 | 0.25 | 0.45 | −0.3 |
| 60% | low | 0.45 | 0.08 | 0.6 | 0.08 | 0.6 | −0.6 | 0.08 | 0.6 | −0.1 |
|  | high | 0.75 | 0.25 | 0.95 | 0.25 | 0.95 | −0.95 | 0.25 | 0.95 | −0.3 |
| 70% | low | 0.45 | 0.08 | 0.6 | 0.08 | 0.6 | −0.6 | 0.08 | 0.6 | −0.1 |
|  | high | 0.75 | 0.25 | 0.95 | 0.25 | 0.95 | −0.95 | 0.25 | 0.95 | −0.3 |
| 80% | low | 0.45 | 0.08 | 0.6 | 0.08 | 0.6 | −0.6 | 0.08 | 0.6 | −0.1 |
|  | high | 0.75 | 0.25 | 0.95 | 0.25 | 0.95 | −0.95 | 0.25 | 0.95 | −0.3 |
| 90%-130% | low | 0.5 | 0.1 | 0.6 | 0.08 | 0.6 | −0.6 | 0.08 | 0.6 | −0.1 |
|  | high | 0.99 | 0.6 | 0.95 | 0.25 | 0.95 | −0.95 | 0.25 | 0.95 | −0.3 |

The third table below relates to standard sections of the third type that are symmetric and that minimize the negative lift $F_D$ of the tail boom, with an example of such a section being shown in FIG. 5:

| t/c | value | uA1, uA3 | vA01 | uA02 | uA11 | vA12 | vA21 | uA22 | uA31 | vA32 |
|---|---|---|---|---|---|---|---|---|---|---|
| 50% | low | 0.2 | 0.5 | 0.1 | 0.2 | 0.1 | −0.1 | 0.2 | 0.1 | −0.5 |
|  | high | 0.5 | 0.9 | 0.4 | 0.4 | 0.4 | −0.4 | 0.4 | 0.4 | −0.9 |
| 60% | low | 0.2 | 0.5 | 0.1 | 0.3 | 0.1 | −0.1 | 0.3 | 0.1 | −0.5 |
|  | high | 0.5 | 0.9 | 0.4 | 0.7 | 0.4 | −0.4 | 0.7 | 0.4 | −0.9 |
| 70% | low | 0.2 | 0.5 | 0.1 | 0.3 | 0.1 | −0.1 | 0.3 | 0.1 | −0.5 |
|  | high | 0.5 | 0.9 | 0.4 | 0.7 | 0.4 | −0.4 | 0.7 | 0.4 | −0.9 |
| 80% | low | 0.2 | 0.5 | 0.1 | 0.4 | 0.1 | −0.1 | 0.4 | 0.1 | −0.5 |
|  | high | 0.5 | 0.9 | 0.4 | 0.7 | 0.4 | −0.4 | 0.7 | 0.4 | −0.9 |
| 90%-130% | low | 0.2 | 0.5 | 0.1 | 0.7 | 0.1 | −0.1 | 0.7 | 0.1 | −0.5 |
|  | high | 0.5 | 0.9 | 0.4 | 0.95 | 0.4 | −0.4 | 0.95 | 0.4 | −0.9 |

Finally, the fourth table below relates to standard sections of the fourth type that are asymmetric, and that minimize the negative lift $F_D$ of the tail boom:

| value | uA1, uA3 | vA01 | uA02 | uA11 | vA12 | vA21 | uA22 | uA31 | vA32 |
|---|---|---|---|---|---|---|---|---|---|
| low | 0.2 | 0.1 | 0.55 | 0.1 | 0.65 | −0.65 | 0.1 | 0.65 | −0.1 |
| high | 0.5 | 0.3 | 0.85 | 0.4 | 0.9 | −0.9 | 0.25 | 0.9 | −0.3 |

These values for this fourth type of standard sections are independent of the ratio t/c.

Furthermore, the symmetric standard sections of the first and third types are independent of the direction of rotation of the main rotor 3. In contrast, the asymmetric standard sections of the second and fourth types differ depending on the direction of rotation of the main rotor 3. Thus, an asymmetric standard section defined for a main rotor 3 rotating counterclockwise in a plan view needs to be made symmetric relative to the abscissa axis U in order to define an equivalent asymmetric section for a main rotor 3 rotating in the clockwise direction.

These tables of the database provide values for a main rotor 3 rotating clockwise in FIG. 1.

The abscissa and ordinate coordinates not supplied in the tables are defined by the designer and may also be imposed by manufacturing or tangency constraints.

In particular, as shown in FIG. 5, a first extreme characteristic point A0 is situated at the trailing edge 12 with coordinates (1,0). A second extreme characteristic point A2 is situated at the leading edge 11 with coordinates (0,0). Furthermore, the extreme characteristic points A1 and A3 forming the maximum thickness t of the standard section have respective coordinates −t/(2.c) and t/(2.c). These extreme characteristic points A1 and A3 have the same abscissa coordinates.

Furthermore, for the tail boom section shown in FIG. 5, the abscissa and ordinate coordinates that are not supplied by these tables are imposed by tangency constraints at each extreme characteristic point A0, A1, A2, A3 such that the standard section is tangent continuous. The ordinate coordinates of the intermediate characteristic points A02, A11 are equal to the ordinate coordinates of the extreme characteristic point A1 with which they are associated, whereas the ordinate coordinates of the intermediate characteristic points A22, A31 are equal to the ordinate coordinate of the extreme characteristic point A3 with which they are attached. Likewise, the abscissa coordinates of the intermediate characteristic points A01, A32 are equal to the abscissa coordinates of the extreme characteristic point A0, and the abscissa coordinates of the intermediate characteristic points A12, A21 are equal to the abscissa coordinate of the extreme characteristic point A2.

Furthermore, in FIG. 5, it can be seen that for symmetric standard sections of the third type, the maximum thickness t is arranged upstream from the middle of the chord c in the flow direction of the air stream. Likewise, for asymmetric standard sections of the fourth type, the maximum thickness t is likewise arranged upstream from the middle of the chord c in the flow direction of the air stream.

In contrast, for symmetric standard sections of the first type and for asymmetric standard sections of the second type, the maximum thickness t of the section of the tail boom 10 is arranged downstream from the middle of the chord c in the flow direction of the air stream from the main rotor 3. Furthermore, for asymmetric standard sections of the second type, the maximum thickness t of the section is arranged in the proximity of the middle of the chord c.

Consequently, the method of optimizing the sections of a tail boom comprises a step 102 of establishing the aerodynamic and structural characteristics looked for in the tail boom 10 that define in particular the needs of the aircraft 1 in terms of lateral force $F_L$ and of negative lift $F_D$ as generated by the air stream from the main rotor 3 flowing over the tail boom 10, together with the general dimensions of the tail boom 10 and its relative thickness for certain sections.

These looked-for aerodynamic characteristics of the tail boom 10 are defined mainly by the types of mission that the aircraft is to perform. Thus, if the aircraft 1 is to perform a large number of vertical climbing flights, the looked-for aerodynamic characteristics of the tail boom 10 are specifically minimizing the negative lift $F_D$. In most other cases, the looked-for aerodynamic characteristics are for maximizing the lateral force $F_L$.

Furthermore, the structural characteristics of the tail boom 10 define dimensional ranges and mechanical strength structural ranges for the tail boom 10 respectively characterizing firstly connecting the tail boom 10 with the architecture of the aircraft 1, and secondly stiffness and mechanical strength of the tail boom 10.

Finally, the method of optimizing sections for a tail boom includes a step 103 of defining sections of the tail boom 10. Sections are defined as a function of the standard sections in the database, of the looked-for aerodynamic and structural characteristics of the tail boom 10, and generally of the ratio t/c of each section.

In addition, selecting between a tail boom 10 having sections that are symmetric or else asymmetric may depend on criteria that are structural. Such a tail boom having symmetric sections is simple to construct and serves to limit its weight, while presenting behavior that is symmetric relative to the air flow from the main rotor 3.

In contrast, a tail boom 10 having sections that are asymmetric generally presents structural complexity and the aircraft 1 has overall behavior that is non-linear as a function of this asymmetry. Nevertheless, the aerodynamic improvements obtained as a result of standard sections from the database of the method of the invention and in particular as a result of an increased in the lateral force $F_L$ can make it possible to compensate for such structural complexity and its accompanying weight.

Naturally, the present invention may be subjected to numerous variations as to its implementation. Although several embodiments are described, it can readily be understood that it is not conceivable to identify exhaustively all possible embodiments. It is naturally possible to envisage replacing any of the means described by equivalent means without going beyond the ambit of the present invention.

What is claimed is:

1. A method for producing a tail boom for a rotary wing aircraft having a main rotor and a fuselage, the tail boom to extend from the fuselage in a longitudinal direction, the tail boom to be constituted by successive sections with each section being defined in a plane perpendicular to the longitudinal direction by a chord between a leading edge and a trailing edge of the section and by a maximum thickness measured perpendicularly to the chord, the method comprising:

an optimization process for defining the sections of the tail boom, the optimization process including the steps of:

a step of performing studies, digital simulations, and/or tests for determining standard sections for the tail boom;

a step of creating a database characterizing the standard sections for the tail boom, the database having four types of standard sections for the tail boom, a first type of standard sections being symmetric and maximizing a lateral force of the tail boom, a second type of standard sections being asymmetric and maximizing the lateral force of the tail boom, a third type of standard sections being symmetric and minimizing a negative lift of the tail boom, and a fourth type of standard sections being asymmetric and minimizing the negative lift of the tail boom;

each standard section being defined by extreme characteristic points A0, A1, A2, A3, and by intermediate characteristic points A1, A2, A11, A12, A21, A22, A31, A32, the characteristic points being defined in a secondary reference frame attached to each standard section and defined by the directions of the chord and of the maximum thickness of the standard section, one unit along the abscissa axis or along the ordinate axis being equal to the chord, the extreme characteristic points A0, A1, A2, A3, belonging to an outline of the standard section, A0 being situated at the trailing edge and having coordinates (1,0), A2 being situated at the leading edge and having coordinates (0,0), the extreme characteristic points A1 and A3 forming the maximum thickness and having respective coordinates $-t/(2.c)$ and $t/(2.c)$, the intermediate characteristic points A01, A02, A11, A12, A21, A22, A31, A32 being construction points for constructing the outline of the standard section serving to define a direction of the outline of the section at each extreme characteristic point A0, A1, A2, A3;

a step of establishing looked-for aerodynamic and structural characteristics of the tail boom in terms of lateral force and negative lift generated by an air stream from the main rotor flowing over the tail boom;

a step of defining the sections of the tail boom as a function of the standard sections and of the looked-for aerodynamic and structural characteristics for the tail boom in order to give precedence to minimizing the negative lift and/or to maximizing the lateral force of the tail boom; and the method further comprising providing the tail boom having the sections as defined per the optimization process.

2. The method according to claim 1, wherein each standard section being further defined as a function of the ratio of the maximum thickness of the standard section divided by the chord of the standard section.

3. The method according to claim 2, wherein for each standard section of the first type, the maximum thickness of the standard section is arranged downstream from the middle of the chord of the standard section in the flow direction of the air stream from the main rotor;

for each standard section of the second type, the maximum thickness of the standard section is arranged downstream from the middle of the chord of the standard section and in the proximity of the middle of the chord of the standard section; and for each standard section of the third type and for each standard section of the fourth type, the maximum thickness of the standard section is arranged upstream from the middle of the chord of the standard section.

4. The method according to claim 1, wherein the database comprises the following first table defining ranges for the characteristic points for standard sections of the first type:

| t/c | value | uA1, uA3 | vA01 | uA02 | uA11 | vA12 | vA21 | uA22 | uA31 | vA32 |
|---|---|---|---|---|---|---|---|---|---|---|
| 50% | low | 0.55 | 0.6 | 0.1 | 0.6 | 0.08 | −0.08 | 0.6 | 0.1 | −0.6 |
|  | high | 0.95 | 0.95 | 0.25 | 0.95 | 0.25 | −0.25 | 0.95 | 0.25 | −0.95 |
| 60% | low | 0.55 | 0.6 | 0.1 | 0.6 | 0.08 | −0.08 | 0.6 | 0.1 | −0.6 |
|  | high | 0.95 | 0.95 | 0.25 | 0.95 | 0.25 | −0.25 | 0.95 | 0.25 | −0.95 |
| 70% | low | 0.55 | 0.6 | 0.08 | 0.6 | 0.08 | −0.08 | 0.6 | 0.08 | −0.6 |
|  | high | 0.95 | 0.95 | 0.4 | 0.95 | 0.25 | −0.25 | 0.95 | 0.4 | −0.95 |
| 80% | low | 0.55 | 0.6 | 0.1 | 0.6 | 0.08 | −0.08 | 0.6 | 0.1 | −0.6 |
|  | high | 0.95 | 0.95 | 0.25 | 0.95 | 0.25 | −0.25 | 0.95 | 0.25 | −0.95 |
| 90%-130% | low | 0.55 | 0.6 | 0.1 | 0.6 | 0.08 | −0.08 | 0.6 | 0.1 | −0.6 |
|  | high | 0.99 | 0.95 | 0.25 | 0.95 | 0.25 | −0.25 | 0.95 | 0.25 | −0.95 | the database includes the following second table defining ranges for the characteristic points for standard sections of the second type for the main rotor rotating in the counterclockwise direction when seen from above:

| t/c | value | uA1, uA3 | vA01 | uA02 | uA11 | vA12 | vA21 | uA22 | uA31 | vA32 |
|---|---|---|---|---|---|---|---|---|---|---|
| 50% | low | 0.45 | 0.08 | 0.6 | 0.08 | 0.6 | −0.6 | 0.08 | 0.25 | −0.1 |
|  | high | 0.75 | 0.25 | 0.95 | 0.25 | 0.95 | −0.95 | 0.25 | 0.45 | −0.3 |
| 60% | low | 0.45 | 0.08 | 0.6 | 0.08 | 0.6 | −0.6 | 0.08 | 0.6 | −0.1 |
|  | high | 0.75 | 0.25 | 0.95 | 0.25 | 0.95 | −0.95 | 0.25 | 0.95 | −0.3 |
| 70% | low | 0.45 | 0.08 | 0.6 | 0.08 | 0.6 | −0.6 | 0.08 | 0.6 | −0.1 |
|  | high | 0.75 | 0.25 | 0.95 | 0.25 | 0.95 | −0.95 | 0.25 | 0.95 | −0.3 |
| 80% | low | 0.45 | 0.08 | 0.6 | 0.08 | 0.6 | −0.6 | 0.08 | 0.6 | −0.1 |
|  | high | 0.75 | 0.25 | 0.95 | 0.25 | 0.95 | −0.95 | 0.25 | 0.95 | −0.3 |
| 90%-130% | low | 0.5 | 0.1 | 0.6 | 0.08 | 0.6 | −0.6 | 0.08 | 0.6 | −0.1 |
|  | high | 0.99 | 0.6 | 0.95 | 0.25 | 0.95 | −0.95 | 0.25 | 0.95 | −0.3 | the database includes the following third table defining ranges for the characteristic points for standard sections of the third type:

| t/c | value | uA1, uA3 | vA01 | uA02 | uA11 | vA12 | vA21 | uA22 | uA31 | vA32 |
|---|---|---|---|---|---|---|---|---|---|---|
| 50% | low | 0.2 | 0.5 | 0.1 | 0.2 | 0.1 | −0.1 | 0.2 | 0.1 | −0.5 |
|  | high | 0.5 | 0.9 | 0.4 | 0.4 | 0.4 | −0.4 | 0.4 | 0.4 | −0.9 |
| 60% | low | 0.2 | 0.5 | 0.1 | 0.3 | 0.1 | −0.1 | 0.3 | 0.1 | −0.5 |
|  | high | 0.5 | 0.9 | 0.4 | 0.7 | 0.4 | −0.4 | 0.7 | 0.4 | −0.9 |
| 70% | low | 0.2 | 0.5 | 0.1 | 0.3 | 0.1 | −0.1 | 0.3 | 0.1 | −0.5 |
|  | high | 0.5 | 0.9 | 0.4 | 0.7 | 0.4 | −0.4 | 0.7 | 0.4 | −0.9 |

-continued

| t/c | value | uA1, uA3 | vA01 | uA02 | uA11 | vA12 | vA21 | uA22 | uA31 | vA32 |
|---|---|---|---|---|---|---|---|---|---|---|
| 80% | low | 0.2 | 0.5 | 0.1 | 0.4 | 0.1 | −0.1 | 0.4 | 0.1 | −0.5 |
|  | high | 0.5 | 0.9 | 0.4 | 0.7 | 0.4 | −0.4 | 0.7 | 0.4 | −0.9 |
| 90%-130% | low | 0.2 | 0.5 | 0.1 | 0.7 | 0.1 | −0.1 | 0.7 | 0.1 | −0.5 |
|  | high | 0.5 | 0.9 | 0.4 | 0.95 | 0.4 | −0.4 | 0.95 | 0.4 | −0.9 | and the database includes the following fourth table defining ranges for the characteristic points for standard sections of the fourth type for the main rotor rotating in the counterclockwise direction when seen from above:

| Value | uA1, uA3 | vA01 | uA02 | uA11 | vA12 | vA21 | uA22 | uA31 | vA32 |
|---|---|---|---|---|---|---|---|---|---|
| Low | 0.2 | 0.1 | 0.55 | 0.1 | 0.65 | −0.65 | 0.1 | 0.65 | −0.1 |
| High | 0.5 | 0.3 | 0.85 | 0.4 | 0.9 | −0.9 | 0.25 | 0.9 | −0.3. |

5. The method according to claim 4, wherein the ordinate coordinates of the intermediate characteristic points A02, A11 are equal to the ordinate coordinate of the extreme characteristic point A1, the ordinate coordinates of the intermediate characteristic points A22, A31, are equal to the ordinate coordinate of the extreme characteristic point A3, the abscissa coordinates of the intermediate characteristic points A01, A32 are equal to the abscissa coordinate of the extreme characteristic point A0 and the abscissa coordinates of the intermediate characteristic points A12, A21 are equal to the abscissa coordinate of the extreme characteristic point A2.

6. The method according to claim 1, wherein each section of the tail boom is formed by $4^{th}$-order Bezier curves connecting the extreme characteristic points A0, A1, A2, A3, A0 together in pairs and constructed using the intermediate characteristic points A01, A02, A11, A12, A21, A22, A31, A32.

7. A tail boom for a rotary wing aircraft having a main rotor and a fuselage, the tail boom comprising:
a plurality of successive sections extending in a longitudinal direction, the sections including a lead section connectable to the fuselage to connect the tail boom to the fuselage, each section being defined in a plane perpendicular to the longitudinal direction by a chord between a leading edge and a trailing edge of the section and by a maximum thickness measured perpendicularly to the chord; and
wherein the sections of the tail boom are defined using an optimization process including the following steps:
a step of performing studies, digital simulations, and/or tests for determining standard sections for the tail boom;
a step of creating a database characterizing the standard sections for the tail boom, the database having four types of standard sections for the tail boom, a first type of standard sections being symmetric and maximizing a lateral force of the tail boom, a second type of standard sections being asymmetric and maximizing the lateral force of the tail boom, a third type of standard sections being symmetric and minimizing a negative lift of the tail boom, and a fourth type of standard sections being asymmetric and minimizing the negative lift of the tail boom;
each standard section being defined by extreme characteristic points A0, A1, A2, A3 and by intermediate characteristic points A01, A02, A11, A12, A21, A22, A31, A32, the characteristic points being defined in a secondary reference frame attached to each standard section and defined by the directions of the chord of the standard section and of the maximum thickness of the standard section, one unit along the abscissa axis or along the ordinate axis being equal to the chord, the extreme characteristic points A0, A1, A2, A3 belonging to an outline of the standard section, A0 being situated at the trailing edge and having coordinates (1,0), A2 being situated at the leading edge and having coordinates (0,0), the extreme characteristic points A1 and A3 forming the maximum thickness and having respective coordinates −t/(2c) and t/(2c), the intermediate characteristic points A01, A02, A11, A12, A21, A22, A31, A32 being construction points for constructing the outline of the standard section serving to define a direction of the outline of the section at each extreme characteristic point A0, A1, A2, A3;
a step of establishing looked-for aerodynamic and structural characteristics of the tail boom in terms of lateral force and negative lift generated by an air stream from the main rotor flowing over the tail boom; and
a step of defining the sections of the tail boom as a function of the standard sections and of the looked-for aerodynamic and structural characteristics of the tail boom in order to give precedence to minimizing the negative lift and/or to maximizing the lateral force of the tail boom.

8. The tail boom of claim 7 wherein:
each standard section being further defined as a function of the ratio of the maximum thickness of the standard section divided by the chord of the standard section.

9. The tail boom of claim 8 wherein:
for each standard section of the first type, the maximum thickness of the standard section is arranged downstream from the middle of the chord of the standard section in the flow direction of the air stream from the main rotor;
for each standard section of the second type, the maximum thickness of the standard section is arranged downstream from the middle of the chord of the standard section and in the proximity of the middle of the chord of the standard section; and
for each standard section of the third type and for each standard section of the fourth type, the maximum thickness of the standard section is arranged upstream from the middle of the chord of the standard section.

10. The tail boom of claim 7 wherein:
the database includes the following first table defining ranges for the characteristic points for standard sections of the first type:

| t/c | value | uA1, uA3 | vA01 | uA02 | uA11 | vA12 | vA21 | uA22 | uA31 | vA32 |
|---|---|---|---|---|---|---|---|---|---|---|
| 50% | low | 0.55 | 0.6 | 0.1 | 0.6 | 0.08 | −0.08 | 0.6 | 0.1 | −0.6 |
|  | high | 0.95 | 0.95 | 0.25 | 0.95 | 0.25 | −0.25 | 0.95 | 0.25 | −0.95 |
| 60% | low | 0.55 | 0.6 | 0.1 | 0.6 | 0.08 | −0.08 | 0.6 | 0.1 | −0.6 |
|  | high | 0.95 | 0.95 | 0.25 | 0.95 | 0.25 | −0.25 | 0.95 | 0.25 | −0.95 |
| 70% | low | 0.55 | 0.6 | 0.08 | 0.6 | 0.08 | −0.08 | 0.6 | 0.08 | −0.6 |
|  | high | 0.95 | 0.95 | 0.4 | 0.95 | 0.25 | −0.25 | 0.95 | 0.4 | −0.95 |
| 80% | low | 0.55 | 0.6 | 0.1 | 0.6 | 0.08 | −0.08 | 0.6 | 0.1 | −0.6 |
|  | high | 0.95 | 0.95 | 0.25 | 0.5 | 0.25 | −0.25 | 0.95 | 0.25 | −0.95 |
| 90%-130% | low | 0.55 | 0.6 | 0.1 | 0.6 | 0.08 | −0.08 | 0.6 | 0.1 | −0.6 |
|  | high | 0.99 | 0.95 | 0.25 | 0.95 | 0.25 | −0.25 | 0.95 | 0.25 | −0.95 | the database includes the following second table defining ranges for the characteristic points for standard sections of the second type for the main rotor rotating in the counterclockwise direction when seen from above:

| t/c | value | uA1, uA3 | vA01 | uA02 | uA11 | vA12 | vA21 | uA22 | uA31 | vA32 |
|---|---|---|---|---|---|---|---|---|---|---|
| 50% | low | 0.45 | 0.08 | 0.6 | 0.08 | 0.6 | −0.6 | 0.08 | 0.25 | −0.1 |
|  | high | 0.75 | 0.25 | 0.95 | 0.25 | 0.95 | −0.95 | 0.25 | 0.45 | −0.3 |
| 60% | low | 0.45 | 0.08 | 0.6 | 0.08 | 0.6 | −0.6 | 0.08 | 0.6 | −0.1 |
|  | high | 0.75 | 0.25 | 0.95 | 0.25 | 0.95 | −0.95 | 0.25 | 0.95 | −0.3 |
| 70% | low | 0.45 | 0.08 | 0.6 | 0.08 | 0.6 | −0.6 | 0.08 | 0.6 | −0.1 |
|  | high | 0.75 | 0.25 | 0.95 | 0.25 | 0.95 | −0.95 | 0.25 | 0.95 | −0.3 |
| 80% | low | 0.45 | 0.08 | 0.6 | 0.08 | 0.6 | −0.6 | 0.08 | 0.6 | −0.1 |
|  | high | 0.75 | 0.25 | 0.95 | 0.25 | 0.95 | −0.95 | 0.25 | 0.95 | −0.3 |
| 90%-130% | low | 0.5 | 0.1 | 0.6 | 0.08 | 0.6 | −0.6 | 0.08 | 0.6 | −0.1 |
|  | high | 0.99 | 0.6 | 0.95 | 0.25 | 0.95 | −0.95 | 0.25 | 0.95 | −0.3 | the database includes the following third table defining ranges for the characteristic points for standard sections of the third type:

| t/c | value | uA1, uA3 | vA01 | uA02 | uA11 | vA12 | vA21 | uA22 | uA31 | vA32 |
|---|---|---|---|---|---|---|---|---|---|---|
| 50% | low | 0.2 | 0.5 | 0.1 | 0.2 | 0.1 | −0.1 | 0.2 | 0.1 | −0.5 |
|  | high | 0.5 | 0.9 | 0.4 | 0.4 | 0.4 | −0.4 | 0.4 | 0.4 | −0.9 |
| 60% | low | 0.2 | 0.5 | 0.1 | 0.3 | 0.1 | −0.1 | 0.3 | 0.1 | −0.5 |
|  | high | 0.5 | 0.9 | 0.4 | 0.7 | 0.4 | −0.4 | 0.7 | 0.4 | −0.9 |
| 70% | low | 0.2 | 0.5 | 0.1 | 0.3 | 0.1 | −0.1 | 0.3 | 0.1 | −0.5 |
|  | high | 0.5 | 0.9 | 0.4 | 0.7 | 0.4 | −0.4 | 0.7 | 0.4 | −0.9 |
| 80% | low | 0.2 | 0.5 | 0.1 | 0.4 | 0.1 | −0.1 | 0.4 | 0.1 | −0.5 |
|  | high | 0.5 | 0.9 | 0.4 | 0.7 | 0.4 | −0.4 | 0.7 | 0.4 | −0.9 |
| 90%-130% | low | 0.2 | 0.5 | 0.1 | 0.7 | 0.1 | −0.1 | 0.7 | 0.1 | −0.5 |
|  | high | 0.5 | 0.9 | 0.4 | 0.95 | 0.4 | −0.4 | 0.95 | 0.4 | −0.9 | and the database includes the following fourth table defining ranges for the characteristic points for standard sections of the fourth type for the main rotor rotating in the counterclockwise direction when seen from above:

| value | uA1, uA3 | vA01 | uA02 | uA11 | vA12 | vA21 | uA22 | uA31 | vA32 |
|---|---|---|---|---|---|---|---|---|---|
| low | 0.2 | 0.1 | 0.55 | 0.1 | 0.65 | −0.65 | 0.1 | 0.65 | −0.1 |
| high | 0.5 | 0.3 | 0.85 | 0.4 | 0.9 | −0.9 | 0.25 | 0.9 | −0.3. |

11. The tail boom of claim 10 wherein:
the ordinate coordinates of the intermediate characteristic points A02, A11 are equal to the ordinate coordinate of the extreme characteristic point A1, the ordinate coordinates of the intermediate characteristic points A22, A31 are equal to the ordinate coordinate of the extreme characteristic point A3, the abscissa coordinates of the intermediate characteristic points A01, A32 are equal to the abscissa coordinate of the extreme characteristic point A0, and the abscissa coordinates of the intermediate characteristic points A12, A21 are equal to the abscissa coordinate of the extreme characteristic point A2.

12. The tail boom of claim 7 wherein:
each section of the tail boom is formed by $4^{th}$-order Bezier curves connecting the extreme characteristic points A0, A1, A2, A3, A0 together in pairs and constructed using the intermediate characteristic points A01, A02, A11, A12, A21, A22, A31, A32.

13. A rotary wing aircraft comprising:
a fuselage and a main rotor having a plurality of blades;
a tail boom extending from the fuselage in a longitudinal direction, the tail boom being constituted by successive sections, each section being defined in a plane perpendicular to the longitudinal direction by a chord between a leading edge and a trailing edge of the section and by a maximum thickness measured perpendicularly to the chord; and
wherein the sections of the tail boom are defined using an optimization process including the following steps:
a step of performing studies, digital simulations, and/or tests for determining standard sections for the tail boom;
a step of creating a database characterizing the standard sections for the tail boom, the database having four types of standard sections for the tail boom, a first type of standard sections being symmetric and maximizing a lateral force of the tail boom, a second type of standard sections being asymmetric and maximizing the lateral force of the tail boom, a third type of standard sections being symmetric and minimizing a negative lift of the tail boom, and a fourth type of standard sections being asymmetric and minimizing the negative lift of the tail boom;

each standard section being defined by extreme characteristic points A0, A1, A2, A3 and by intermediate characteristic points A01, A02, A11, A12, A21, A22, A31, A32, the characteristic points being defined in a secondary reference frame attached to each standard section and defined by the directions of the chord of the standard section and of the maximum thickness of the standard section, one unit along the abscissa axis or along the ordinate axis being equal to the chord, the extreme characteristic points A0, A1, A2, A3 belonging to an outline of the standard section, A0 being situated at the trailing edge and having coordinates (1,0), A2 being situated at the leading edge and having coordinates (0,0), the extreme characteristic points A1 and A3 forming the maximum thickness and having respective coordinates $-t/(2c)$ and $t/(2c)$, the intermediate characteristic points A01, A02, A11, A12, A21, A22, A31, A32 being construction points for constructing the outline of the standard section serving to define a direction of the outline of the section at each extreme characteristic point A0, A1, A2, A3;

a step of establishing looked-for aerodynamic and structural characteristics of the tail boom in terms of lateral force and negative lift generated by an air stream from the main rotor flowing over the tail boom; and a step of defining the sections of the tail boom as a function of the standard sections and of the looked-for aerodynamic and structural characteristics of the tail boom in order to give precedence to minimizing the negative lift and/or to maximizing the lateral force of the tail boom.

14. The rotary wing aircraft of claim 13 wherein:
each standard section being further defined as a function of the ratio of the maximum thickness of the standard section divided by the chord of the standard section.

15. The rotary wing aircraft of claim 14 wherein:
for each standard section of the first type, the maximum thickness of the standard section is arranged downstream from the middle of the chord of the standard section in the flow direction of the air stream from the main rotor;

for each standard section of the second type, the maximum thickness of the standard section is arranged downstream from the middle of the chord of the standard section and in the proximity of the middle of the chord of the standard section; and for each standard section of the third type and for each standard section of the fourth type, the maximum thickness of the standard section is arranged upstream from the middle of the chord of the standard section.

16. The rotary wing aircraft of claim 13 wherein:
the database includes the following first table defining ranges for the characteristic points for standard sections of the first type:

| t/c | value | uA1, uA3 | vA01 | uA02 | uA11 | vA12 | vA21 | uA22 | uA31 | vA32 |
|---|---|---|---|---|---|---|---|---|---|---|
| 50% | low | 0.55 | 0.6 | 0.1 | 0.6 | 0.08 | −0.08 | 0.6 | 0.1 | −0.6 |
|  | high | 0.95 | 0.95 | 0.25 | 0.95 | 0.25 | −0.25 | 0.95 | 0.25 | −0.95 |
| 60% | low | 0.55 | 0.6 | 0.1 | 0.6 | 0.08 | −0.08 | 0.6 | 0.1 | −0.6 |
|  | high | 0.95 | 0.95 | 0.25 | 0.95 | 0.25 | −0.25 | 0.95 | 0.25 | −0.95 |
| 70% | low | 0.55 | 0.6 | 0.08 | 0.6 | 0.08 | −0.08 | 0.6 | 0.08 | −0.6 |
|  | high | 0.95 | 0.95 | 0.4 | 0.95 | 0.25 | −0.25 | 0.95 | 0.4 | −0.95 |
| 80% | low | 0.55 | 0.6 | 0.1 | 0.6 | 0.08 | −0.08 | 0.6 | 0.1 | −0.6 |
|  | high | 0.95 | 0.95 | 0.25 | 0.95 | 0.25 | −0.25 | 0.95 | 0.25 | −0.95 |
| 90%-130% | low | 0.55 | 0.6 | 0.1 | 0.6 | 0.08 | −0.08 | 0.6 | 0.1 | −0.6 |
|  | high | 0.99 | 0.95 | 0.25 | 0.95 | 0.25 | −0.25 | 0.95 | 0.25 | −0.95 | the database includes the following second table defining ranges for the characteristic points for standard sections of the second type for the main rotor rotating in the counterclockwise direction when seen from above:

| t/c | value | uA1, uA3 | vA01 | uA02 | uA11 | vA12 | vA21 | uA22 | uA31 | vA32 |
|---|---|---|---|---|---|---|---|---|---|---|
| 50% | low | 0.45 | 0.08 | 0.6 | 0.08 | 0.6 | −0.6 | 0.08 | 0.25 | −0.1 |
|  | high | 0.75 | 0.25 | 0.95 | 0.25 | 0.95 | −0.95 | 0.25 | 0.45 | −0.3 |
| 60% | low | 0.45 | 0.08 | 0.6 | 0.08 | 0.6 | −0.6 | 0.08 | 0.6 | −0.1 |
|  | high | 0.75 | 0.25 | 0.95 | 0.25 | 0.95 | −0.95 | 0.25 | 0.95 | −0.3 |
| 70% | low | 0.45 | 0.08 | 0.6 | 0.08 | 0.6 | −0.6 | 0.08 | 0.6 | −0.1 |
|  | high | 0.75 | 0.25 | 0.95 | 0.25 | 0.95 | −0.95 | 0.25 | 0.95 | −0.3 |
| 80% | low | 0.45 | 0.08 | 0.6 | 0.08 | 0.6 | −0.6 | 0.08 | 0.6 | −0.1 |
|  | high | 0.75 | 0.25 | 0.95 | 0.25 | 0.95 | −0.95 | 0.25 | 0.95 | −0.3 |
| 90%-130% | low | 0.5 | 0.1 | 0.6 | 0.08 | 0.6 | −0.6 | 0.08 | 0.6 | −0.1 |
|  | high | 0.99 | 0.6 | 0.95 | 0.25 | 0.95 | −0.95 | 0.25 | 0.95 | −0.3 | the database includes the following third table defining ranges for the characteristic points for standard sections of the third type:

| t/c | value | uA1, uA3 | vA01 | uA02 | uA11 | vA12 | vA21 | uA22 | uA31 | vA32 |
|---|---|---|---|---|---|---|---|---|---|---|
| 50% | low | 0.2 | 0.5 | 0.1 | 0.2 | 0.1 | −0.1 | 0.2 | 0.1 | −0.5 |
|  | high | 0.5 | 0.9 | 0.4 | 0.4 | 0.4 | −0.4 | 0.4 | 0.4 | −0.9 |
| 60% | low | 0.2 | 0.5 | 0.1 | 0.3 | 0.1 | −0.1 | 0.3 | 0.1 | −0.5 |
|  | high | 0.5 | 0.9 | 0.4 | 0.7 | 0.4 | −0.4 | 0.7 | 0.4 | −0.9 |
| 70% | low | 0.2 | 0.5 | 0.1 | 0.3 | 0.1 | −0.1 | 0.3 | 0.1 | −0.5 |
|  | high | 0.5 | 0.9 | 0.4 | 0.7 | 0.4 | −0.4 | 0.7 | 0.4 | −0.9 |
| 80% | low | 0.2 | 0.5 | 0.1 | 0.4 | 0.1 | −0.1 | 0.4 | 0.1 | −0.5 |
|  | high | 0.5 | 0.9 | 0.4 | 0.7 | 0.4 | −0.4 | 0.7 | 0.4 | −0.9 |
| 90%-130% | low | 0.2 | 0.5 | 0.1 | 0.7 | 0.1 | −0.1 | 0.7 | 0.1 | −0.5 |
|  | high | 0.5 | 0.9 | 0.4 | 0.95 | 0.4 | −0.4 | 0.95 | 0.4 | −0.9 | and the database includes the following fourth table defining ranges for the characteristic points for standard sections of the fourth type for the main rotor rotating in the counterclockwise direction when seen from above:

| value | uA1, uA3 | vA01 | uA02 | uA11 | vA12 | vA21 | uA22 | uA31 | vA32 |
|---|---|---|---|---|---|---|---|---|---|
| low | 0.2 | 0.1 | 0.55 | 0.1 | 0.65 | −0.65 | 0.1 | 0.65 | −0.1 |
| high | 0.5 | 0.3 | 0.85 | 0.4 | 0.9 | −0.9 | 0.25 | 0.9 | −0.3 |

17. The rotary wing aircraft of claim 16 wherein:
the ordinate coordinates of the intermediate characteristic points A02, A11 are equal to the ordinate coordinate of the extreme characteristic point A1, the ordinate coordinates of the intermediate characteristic points A22, A31 are equal to the ordinate coordinate of the extreme characteristic point A3, the abscissa coordinates of the intermediate characteristic points A01, A32 are equal to the abscissa coordinate of the extreme characteristic point A0, and the abscissa coordinates of the intermediate characteristic points A12, A21 are equal to the abscissa coordinate of the extreme characteristic point A2.

18. The rotary wing aircraft of claim 13 wherein:
each section of the tail boom is formed by $4^{th}$-order Bezier curves connecting the extreme characteristic points A0, A1, A2, A3, A0 together in pairs and constructed using the intermediate characteristic points A01, A02, A11, A12, A21, A22, A31, A32.

* * * * *